US011206387B2

United States Patent
Oh et al.

(10) Patent No.: US 11,206,387 B2
(45) Date of Patent: *Dec. 21, 2021

(54) METHOD FOR TRANSMITTING 360 VIDEO, METHOD FOR RECEIVING 360 VIDEO, APPARATUS FOR TRANSMITTING 360 VIDEO, AND APPARATUS FOR RECEIVING 360 VIDEO

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/065,957

(22) Filed: Oct. 8, 2020

(65) Prior Publication Data

US 2021/0029344 A1    Jan. 28, 2021

Related U.S. Application Data

(63) Continuation of application No. 16/846,014, filed on Apr. 10, 2020, now Pat. No. 10,855,970, which is a (Continued)

(51) Int. Cl.
*H04N 13/194* (2018.01)
*H04N 13/178* (2018.01)
(Continued)

(52) U.S. Cl.
CPC ....... *H04N 13/194* (2018.05); *H04N 5/23238* (2013.01); *H04N 13/122* (2018.05); *H04N 13/161* (2018.05); *H04N 13/178* (2018.05)

(58) Field of Classification Search
CPC .. H04N 13/194; H04N 13/178; H04N 13/122; H04N 13/161; H04N 5/23238;
(Continued)

(56) References Cited

U.S. PATENT DOCUMENTS 10,659,761 B2 *   5/2020   Oh ................... H04N 13/194
10,855,970 B2 * 12/2020   Oh ................... H04N 13/161
(Continued)

FOREIGN PATENT DOCUMENTS

KR        100988872       10/2010
KR       1020170017700     2/2017
(Continued)

OTHER PUBLICATIONS

U.S. Appl. No. 16/479,907, Notice of Allowance dated Jan. 10, 2020, 16 pages.
(Continued)

*Primary Examiner* — James M Pontius
*Assistant Examiner* — Tyler B Edwards
(74) *Attorney, Agent, or Firm* — Lee, Hong, Degerman, Kang & Waimey PC

(57) ABSTRACT

According to one aspect of the present invention, the present invention may relate to a method for transmitting a 360 video. The method for transmitting a 360 video may include processing a plurality of circular images captured by a camera having at least one fisheye lens; encoding a picture
(Continued)

to which the circular images are mapped; generating signaling information about the 360 video data; encapsulating the encoded picture and the signaling information into a file, and transmitting the file.

20 Claims, 26 Drawing Sheets

Related U.S. Application Data continuation of application No. 16/479,907, filed as application No. PCT/KR2018/000011 on Jan. 2, 2018, now Pat. No. 10,659,761.

(60) Provisional application No. 62/561,694, filed on Sep. 22, 2017.

(51) Int. Cl.
*H04N 13/122* (2018.01)
*H04N 13/161* (2018.01)
*H04N 5/232* (2006.01)

(58) Field of Classification Search
CPC .......... H04N 21/2343; H04N 21/2362; H04N 21/81; H04N 21/816
See application file for complete search history.

(56) References Cited

U.S. PATENT DOCUMENTS

| | | |
|---|---|---|
| 2004/0046888 A1 | 3/2004 | Jan et al. |
| 2013/0124471 A1 | 5/2013 | Chen et al. |
| 2016/0142697 A1 | 5/2016 | Budagavi et al. |
| 2016/0323561 A1 | 11/2016 | Jin et al. |
| 2017/0140791 A1 | 5/2017 | Das et al. |
| 2017/0339392 A1* | 11/2017 | Forutanpour ........ H04N 19/597 |
| 2018/0075635 A1* | 3/2018 | Choi .................... H04N 13/106 |
| 2020/0244945 A1 | 7/2020 | Oh et al. |

FOREIGN PATENT DOCUMENTS

| | | |
|---|---|---|
| KR | 1020170084275 | 7/2017 |
| WO | 2017142353 | 8/2017 |

OTHER PUBLICATIONS

PCT International Application No. PCT/KR2018/000621, Notification of Transmittal of the International Search Report and the Written Opinion of the International Searching Authority, or Declaration dated Jun. 20, 2018, 9 pages.

* cited by examiner

FIG. 7
(a) 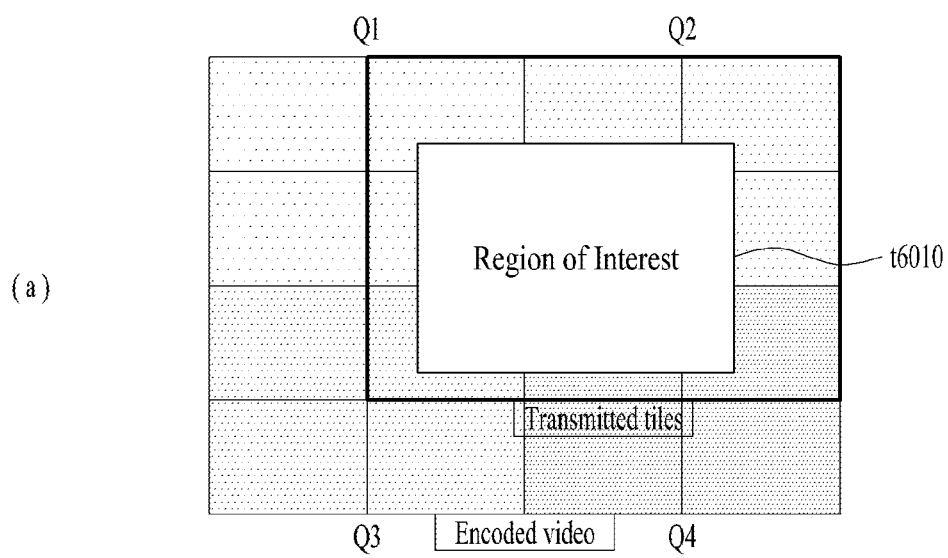
(b) 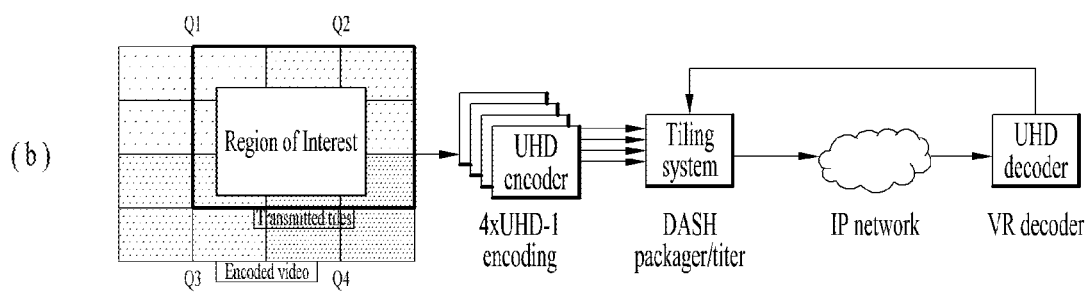

FIG. 8

```
.....
        <Basic metadata>
unsigned    int(8)          vr_geometry;
unsigned    int(8)          projection_schme;
        <metadata related to stereoscopic>
unsigned    int(1)          is_stereoscopic;
unsigned    int(3)          stereo_mode;
        <metadata related initial view>
signed      int(8)          initial_view_yaw_degree;
signed      int(8)          initial_view_pitch_degree;
signed      int(8)          initial_view_roll_degree;
        <metadata related to ROI>
unsigned int(1)             2d_roi_range_flag;
unsigned int(1)             3d_roi_range_flag;
if (2d_roi_region_flag ==1) {
   unsigned int(16) min_top_left_x;
   unsigned int(16) max_top_left_x;
   unsigned int(16) min_top_left_y;
   unsigned int(16) max_top_left_y;
   unsigned int(16) min_width;
   unsigned int(16) max_width;
   unsigned int(16) min_height;
   unsigned int(16) max_height;
   unsigned int(16) min_x;
   unsigned int(16) max_x;
   unsigned int(16) min_y;
   unsigned int(16) max_y;
}
if (3d_roi_region_flag ==1) {
   unsigned int(16) min_yaw;
   unsigned int(16) max_yaw;
   unsigned int(16) min_pitch;
   unsigned int(16) max_pitch;
   unsigned int(16) min_roll;
   unsigned int(16) max_roll;
   unsigned int(16) min_field_of_view;
   unsigned int(16) max_field_of_view;
}
        <metadata related to FOV (Field Of View)>
unsigned int(1)             content_fov_flag;
if (content_fov_flag == 1) {
   unsigned int(16)         content_fov;
}
        <metadata related to cropped region>
unsigned int(1)             is_cropped_region;
if(is_cropped_region == 1) {
   unsigned int(16)         cr_region_left_top_x;
   unsigned int(16)         cr_region_left_top_y;
   unsigned int(16)         cr_region_width;
   unsigned int(16)         cr_region_height;
}
.....
```

FIG. 11
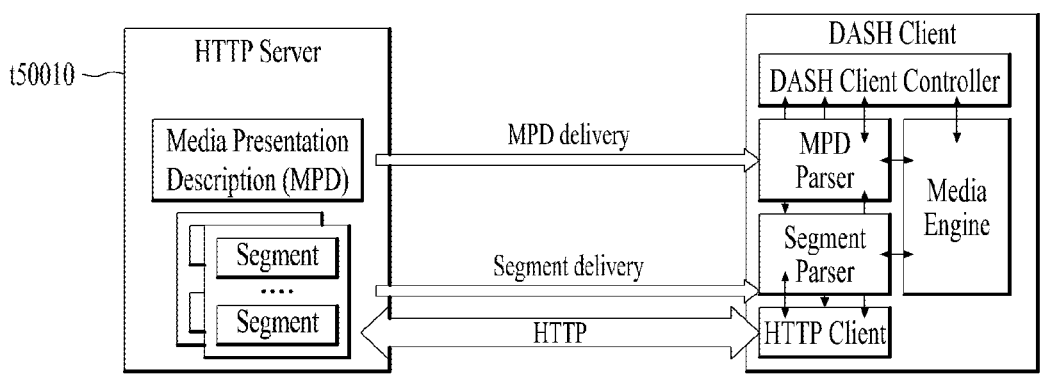
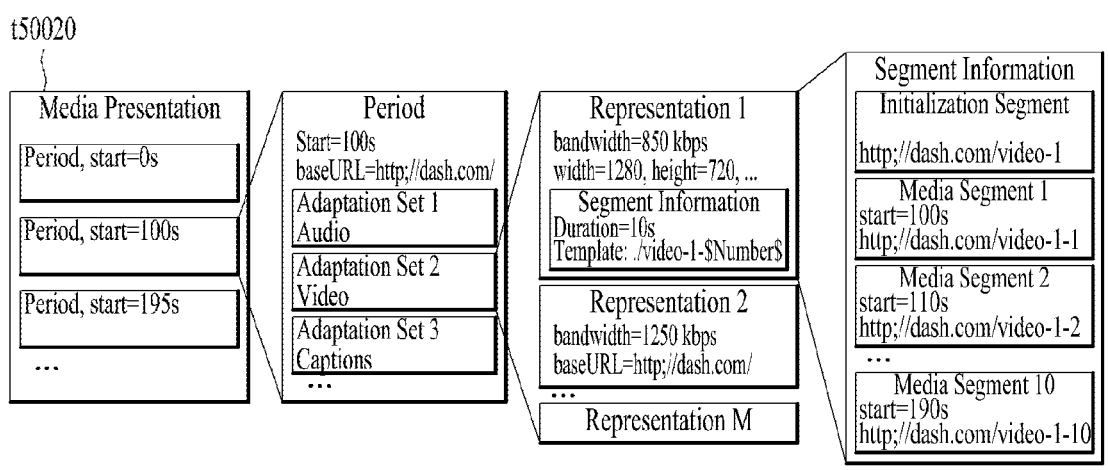

FIG. 17

| sei_payload( payloadType, payloadSize ) { | Category | Descriptor |
|---|---|---|
| if( nal_unit_type == PREFIX_SEI_NUT ) { | | |
| ... | | |
| if( payloadType == XXX ) | | |
| omnidirectional_fisheye_video ( payloadSize ) | 5 | |
| } } | | |

17010

| omnidirectional_fisheye_video ( payloadSize ) { | Descriptor |
|---|---|
| omnidirectional_fisheye_video_id | ue(v) |
| stereoscopic_flag | u(1) |
| synchronized_left_right_360camera_flag | u(1) |
| num_viewing_directions_minus1 | u(6) |
| num_picture_regions_minus1 | u(8) |
| if( stereoscopic_flag == 1 ) | |
|    disparity | u(8) |
| for( i = 0 ; i <= num_viewing_directions_minus1; i++ ) { | |
|    field_of_view[ i ] | u(32) |
|    center_yaw[ i ] | i(32) |
|    center_pitch[ i ] | i(32) |
|    center_roll[ i ] | i(32) |
| } | |
| if(stereoscopic_flag == 1 && left_right_360camera_sync_flag == 0) { | |
|    num_viewing_directions_per_right_view_minus1 | u(6) |
|    reserved | u(2) |
|    for( i = 0 ; i <= num_viewing_directions_per_right_view_minus1; i++ ) { | |
|      field_of_view_per_right_view[ i ] | u(32) |
|      center_yaw_per_right_view[ i ] | i(32) |
|      center_pitch_per_right_view[ i ] | i(32) |
|      center_roll_per_right_view[ i ] | i(32) |
|    } | |
| } | |
| for( i = 0 ; i <= num_picture_regions_minus1; i++ ) { | |
|    region_type[ i ] | u(2) |
|    region_info[ i ] | u(6) |
|    if(region_type[i] == 3) { | |
|      viewing_direction_left_circular_image [i] | u(8) |
|      viewing_direction_right_circular_image[i] | u(8) |
|    } | |
|    rect_region_top[ i ] | u(16) |
|    rect_region_left[ i ] | u(16) |
|    rect_region_width[ i ] | u(16) |
|    rect_region_height[ i ] | u(16) |
|    circular_image_center_x[ i ] | u(16) |
|    circular_image_center_y[ i ] | u(16) |
|    circular_image_radius[ i ] | u(32) |
| } | |
| } | |

| stereoscopic_flag | region_type | region_info |
|---|---|---|
| 0 (monoscopic) | 0,1,2,3 | 0,1,..., num_viewing_directions_minus1 |
| 1 (stereoscopic) | 0 (non-frame packing, left view) | 0,1,..., num_viewing_directions_minus1 |
| | 1 (non-frame packing, right view) | if(synchronized_left_right_360camera_flag == 1)<br>0,1, ..., num_viewing_directions_minus1<br>if(synchronized_left_right_360camera_flag == 0)<br>0,1, ..., num_viewing_directions_per_right_view_minus1 |
| | 2 (frame packing, viewing direction) | 0,1, ..., num_viewing_directions_minus1 |
| | 3 (frame packing, viewing position) | 0 (left), 1 (right), 2 (both views with identical viewing direction) |

FIG. 19
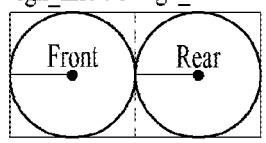 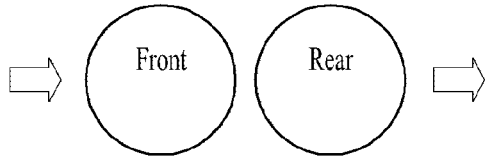 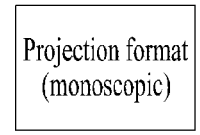
FIG. 20
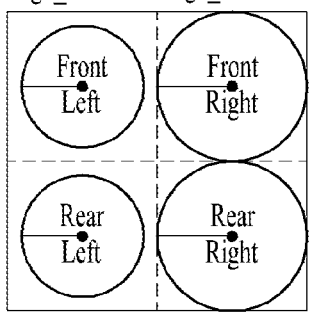 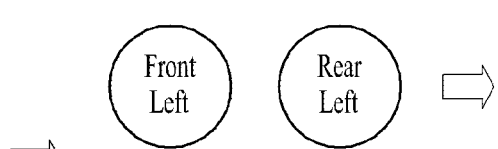 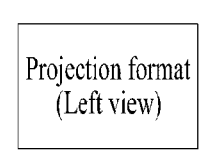
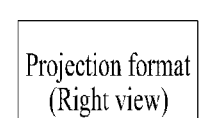

FIG. 21
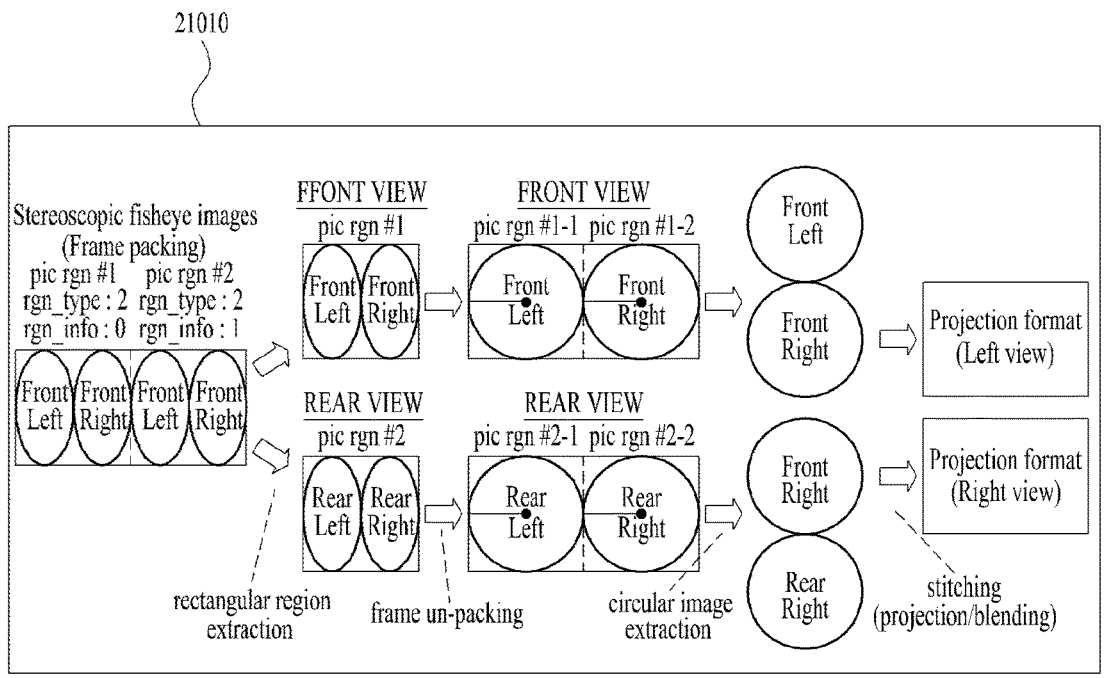
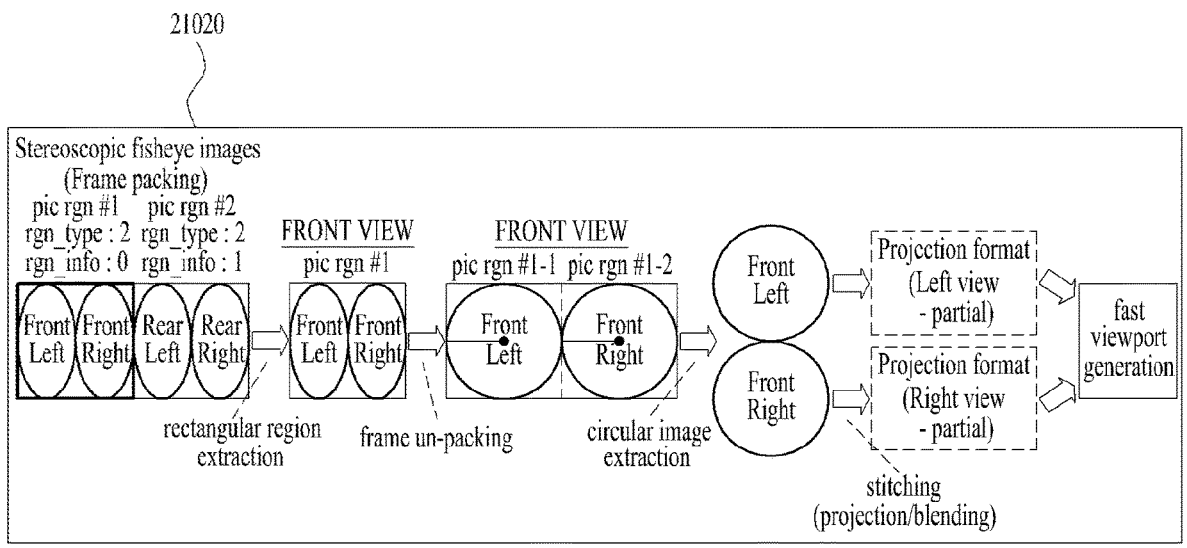

FIG. 22
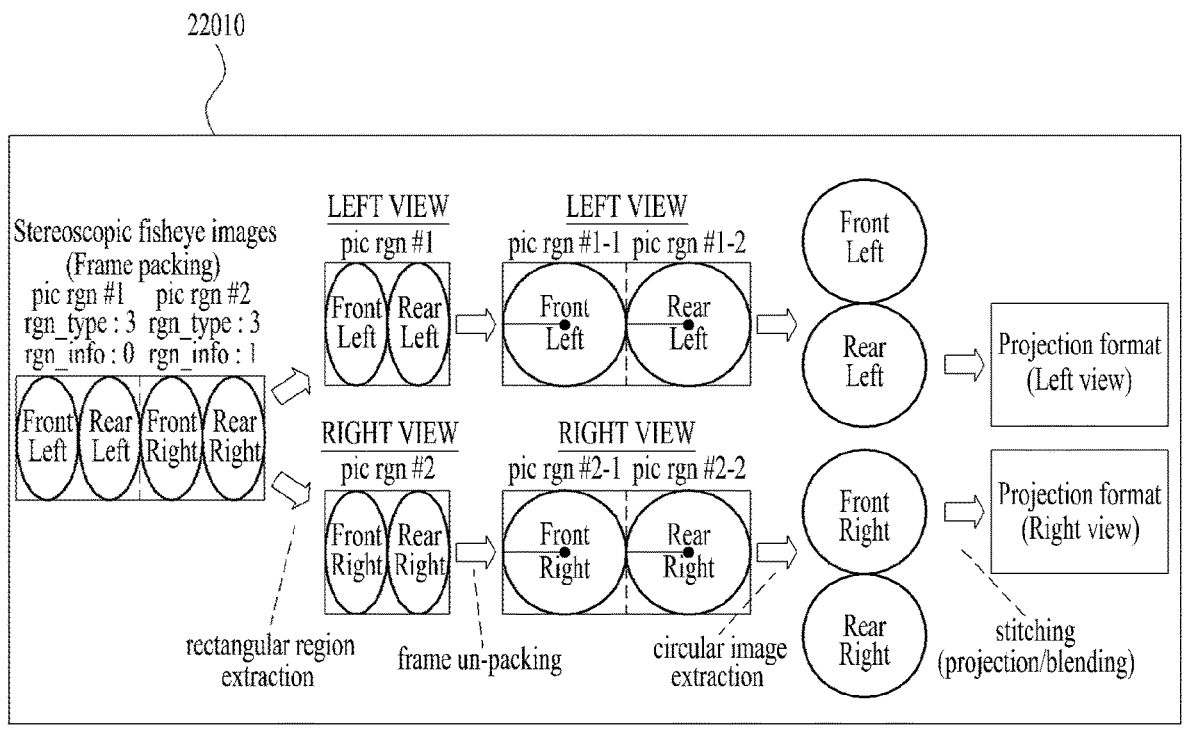
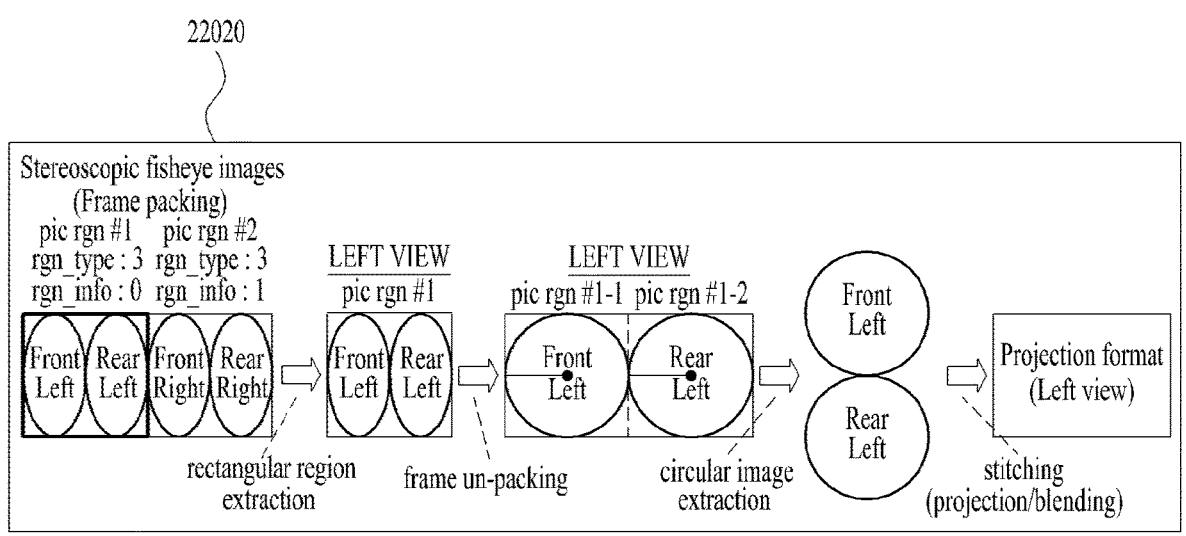

FIG. 23
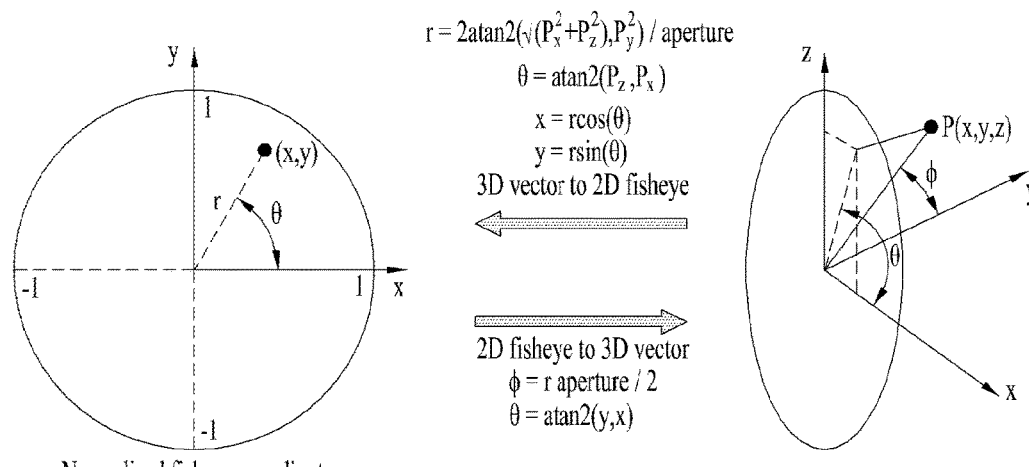
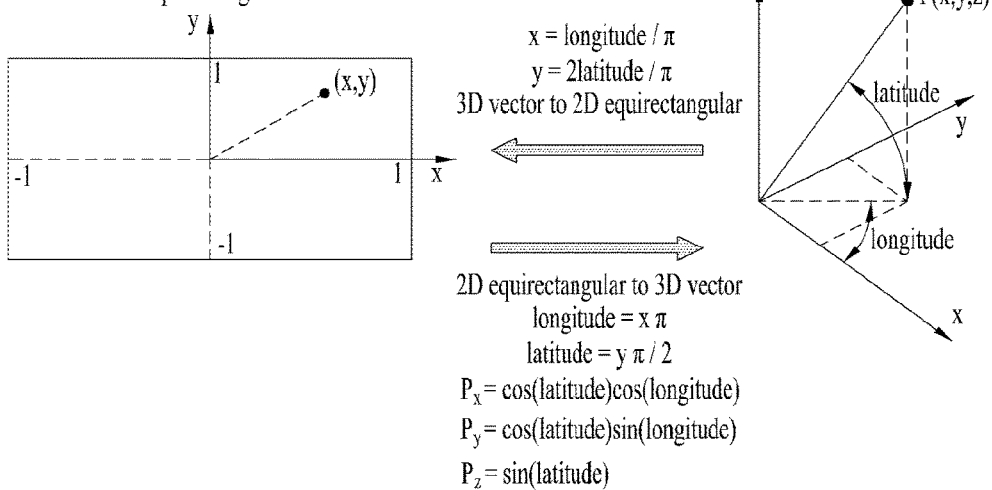

FIG. 24

Fisheye coordinate to 3D fisheye lens capturing coordinate conversion $\alpha = ((\text{sqrt}((x - \text{circular\_image\_center\_x}[i] * 2{-}16) * (x - \text{circular\_image\_center\_x}[i] * 2{-}16) + (y - \text{circular\_image\_center\_y}[i] * 2{-}16) * (y - \text{circular\_image\_center\_y}[i] * 2{-}16)) / (\text{circular\_image\_radius}[i] * 2{-}16)) * \text{field\_of\_view}[i] * 2{-}16 * \pi \div 180) / 2$ $\beta = \text{atan2}((y - \text{circular\_image\_center\_y}[i] * 2{-}16) / (\text{circular\_image\_radius}[i] * 2{-}16), (x - \text{circular\_image\_center\_x}[i] * 2{-}16) / (\text{circular\_image\_radius}[i] * 2{-}16))$ 3D fisheye lens capturing coordinate to XYZ coordinate conversion $Px = \sin\alpha * \cos\beta$
$Py = \cos\alpha$
$Pz = \sin\alpha * \sin\beta$ XYZ coordinate to spherical coordinate conversion $\phi' = \text{atan2}(Py, Px)$
$\theta' = \text{atan2}(Pz, \text{sqrt}(Px*Px + Py*Py))$
$\omega' = \text{center\_roll}[i] * 2{-}16 * \pi \div 180$
$\phi = \cos(\omega') * \phi' - \sin(\omega') * \theta' + \text{center\_yaw}[i] * 2{-}16$
$\theta = \sin(\omega') * \phi' + \cos(\omega') * \theta' + \text{center\_pitch}[i] * 2{-}16$ spherical coordinate to ERP coordinate conversion $x\_ERP = \phi / \pi$
$y\_ERP = 2*\theta / \pi$

FIG. 25

```
aligned (8) class OmnidirectionalFisheyeVideoInformationStruct {
    unsigned int (8) omnidirectional_fisheye_video_id
    unsigned int (1) stereoscopic_flag
    unsigned int (1) synchronized_left_right_360camera_flag
    unsigned int (6) num_viewing_directions_minus1
    unsigned int (8) num_picture_regions_minus1
    if( stereoscopic_flag == 1 )
        unsigned int (8) disparity
    for( i = 0 ; i <= num_viewing_directions_minus1; i++ ) {
        unsigned int (32) field_of_view
        signed int (32) center_yaw
        signed int (32) center_pitch
        signed int (32) center_roll
    }
    if(stereoscopic_flag == 1 && left_right_360camera_sync_flag == 0) {
        unsigned int (8) num_viewing_directions_per_right_view_minus1
        for( i = 0 ; i <= num_viewing_directions_per_right_view_minus1; i++ ) {
            unsigned int (32) field_of_view_per_right_view
            signed int (32) center_yaw_per_right_view
            signed int (32) center_pitch_per_right_view
            signed int (32) center_roll_per_right_view
        }
    }
    for( i = 0 ; i <= num_picture_regions_minus1; i++ ) {
        if( stereoscopic_flag == 1) {
            unsigned int (2)region_type
            unsigned int (6)region_info
            if(region_type[i] == 3) {
                unsigned int (8) viewing_direction_left_circular_image
                unsigned int (8) viewing_direction_right_circular_image
            }
        }
        unsigned int (16) rect_region_top
        unsigned int (16) rect_region_left
        unsigned int (16) rect_region_width
        unsigned int (16) rect_region_height
        unsigned int (16) circular_image_center_x
        unsigned int (16) circular_image_center_y
        unsigned int (32) circular_image_radius
    }
}
```

FIG. 26

26010
```
class OmnidirectionalFisheyeVideoInformationSEI extends Box('ofvb', size)
{
    unsigned int(8*size-64)        omnidirectionalfisheyevideoinformationsei;
}
```

26020
```
class VisualSampleEntry(codingname) extends SampleEntry (codingname){
    unsigned int(16) pre_defined = 0;
    const unsigned int(16) reserved = 0;
    unsigned int(32)[3]       pre_defined = 0;
    unsigned int(16)          width;
    unsigned int(16)          height;
    template unsigned int(32) horizresolution = 0x00480000;   // 72 dpi
    template unsigned int(32) vertresolution  = 0x00480000;   // 72 dpi
    const unsigned int(32)    reserved = 0;
    template unsigned int(16) frame_count = 1;
    string[32]    compressorname;
    template unsigned int(16) depth = 0x0018;
    int(16)       pre_defined = -1;
    // other boxes from derived specifications
    CleanApertureBox           clap;// optional
    PixelAspectRatioBox        pasp;// optional
    OmnidirectionalFisheyeVideoInformationSEI     fisheye_sei;
}
```

26030
```
class HEVCSampleEntry() extends VisualSampleEntry ('hvc1' or 'hev1'){
    HEVCConfigurationBox config;
    MPEG4BitRateBox (); // optional
    MPEG4ExtensionDescriptorsBox (); // optional
    extra_boxes boxes; // optional
} class HEVCConfigurationBox extends Box('hvcC') {
    HEVCDecoderConfigurationRecord() HEVCConfig;
    OmnidirectionalFisheyeVideoInformationSEI     fisheye_sei;
}
```

26040
```
class HEVCSampleEntry() extends VisualSampleEntry ('hvc1' or 'hev1'){
    HEVCConfigurationBox config;
    MPEG4BitRateBox (); // optional
    MPEG4ExtensionDescriptorsBox (); // optional
    OmnidirectionalFisheyeVideoInformationSEI     fisheye_sei;
    extra_boxes boxes; // optional
}
```

26050
```
class OmnidirectionalFisheyeVideoInformationSampleEntry(type) extends
    MetadataSampleEntry (type){OmnidirectionalFisheyeVideoInformationStruct ();
    Box [] other_boxes;
}
```

26060
```
aligned (8) OmnidirectionalFisheyeVideoInformationSample () {
    OmnidirectionalFisheyeVideoInformationStruct ()
}
```

FIG. 27

| @value | Use |
|---|---|
| omnidirectional_fisheye_video_id | O |
| stereoscopic_flag | OD (defualt:flase) |
| synchronized_left_right_360camera_flag | OD (defualt:true) |
| num_viewing_directions_minus1 | D |
| num_picture_regions_minus1 | D |
| disparity | O |
| field_of_view | D |
| center_yaw, center_pitch, center_roll | D |
| num_viewing_directions_per_right_view_minus1 | O |
| field_of_view_per_right_view | O |
| center_yaw_per_right_view, center_pitch_per_right_view, center_roll_per_right_view | O |
| region_type, region_info | D |
| viewing_direction_left_circular_image, viewing_direction_right_circular_image | O |
| rect_region_top, rect_region_left, rect_region_width, rect_region_height | D |
| circular_image_center_x, circular_image_center_y | D |
| circular_image_radius | D |

METHOD FOR TRANSMITTING 360 VIDEO, METHOD FOR RECEIVING 360 VIDEO, APPARATUS FOR TRANSMITTING 360 VIDEO, AND APPARATUS FOR RECEIVING 360 VIDEO

CROSS-REFERENCE TO RELATED APPLICATIONS

This application is a continuation of U.S. patent application Ser. No. 16/846,014, filed on Apr. 10, 2020, which is a continuation of U.S. patent application Ser. No. 16/479,907, filed on Jul. 22, 2019, now U.S. Pat. No. 10,659,761, which is the National Stage filing under 35 U.S.C. 371 of International Application No. PCT/KR2018/000011, filed on Jan. 2, 2018, which claims the benefit of U.S. Provisional Application No. 62/561,694, filed on Sep. 22, 2017, the contents of which are all hereby incorporated by reference herein their entirety.

TECHNICAL FIELD

The present invention relates to a method for transmitting a 360 video, a method for receiving a 360 video, an apparatus for transmitting a 360 video, and an apparatus for receiving a 360 video.

BACKGROUND ART

A virtual reality (VR) system provides, to a user, the experience of being in an electronically projected environment. The VR system can be enhanced in order to provide images with higher definition and spatial sounds. The VR system can allow a user to interactively use VR content.

DISCLOSURE

Technical Problem

The VR system needs to be enhanced in order to more efficiently provide VR environments to users. To this end, it is necessary to provide data transmission efficiency for transmission of a large amount of data such as VR content, robustness between transmission and reception networks, network flexibility considering a mobile receiver, efficient reproduction and a signaling method, etc.

In addition, subtitles based on a typical Timed Text Markup Language (TTML) or subtitles based on a bitmap are not produced considering a 360 video. Accordingly, subtitle-related features and subtitle-related signaling information need to be further extended so as to be suitable for a use case of the VR service in order to provide subtitles suitable for the 360 video.

Technical Solution

In accordance with the objects of the present invention, the present invention proposes a method for transmitting a 360 video, a method for receiving a 360 video, an apparatus for transmitting a 360 video, and an apparatus for receiving a 360 video.

In one aspect of the present invention, provided herein is a method for transmitting a 360 video, the method including processing a plurality of circular images captured by a camera having at least one fisheye lens, wherein the circular images include 360 video data, and the processing includes mapping the circular images to rectangular regions of a picture having a fisheye video format, encoding the picture to which the circular images are mapped, generating signaling information about the 360 video data, wherein the signaling information includes fisheye video information for processing, by a receiver, the circular images, encapsulating the encoded picture and the signaling information into a file, and transmitting the file.

The fisheye video information may include information for describing each of the circular images and information for describing each of the rectangular regions to which the circular images are mapped, wherein the information for describing the circular images and the information for describing the rectangular regions may be used by the receiver to extract 360 video data corresponding to an intersection of the circular images and the rectangular regions.

The information for describing the circular images may include information indicating an angle of view of the fisheye lens having captured the circular images and information indicating coordinates of a center point of a region occupied by the circular images in a 3D space, wherein the information for describing the rectangular regions may include a position of an upper leftmost point, width, and height of the rectangular regions to specify the rectangular regions and information indicating coordinates and a radius of a center point of the circular images mapped to the rectangular regions to specify the circular images.

The information for describing the rectangular regions may include region type information and additional region information having a different meaning according to the region type information, and the circular images mapped to the picture may include 360 stereoscopic video data, wherein the region type information may indicate a viewing position of a single circular image mapped to the rectangular region, and wherein the additional region information may indicate a viewing direction of the single circular image mapped to the rectangular region.

The region type information further may indicate whether a plurality of circular images having the same viewing direction is mapped to the rectangular region, wherein the additional region information may indicate the same viewing direction of the plurality of circular images mapped to the rectangular region.

The region type information further may indicate whether a plurality of circular images having the same viewing position is mapped to the rectangular region, wherein the additional region information may indicate the same viewing position of the plurality of circular images mapped to the rectangular region.

In the processing of the circular images, the circular images may not be subjected to stitching or region-wise packing.

The fisheye video information may be generated in a form of a Dynamic Adaptive Streaming over HTTP (DASH) descriptor and transmitted in media presentation description (MPD) through a separate path different from a path for the file.

In another aspect of the present invention, provided herein is an apparatus for transmitting a 360 video, including a video processor configured to process a plurality of circular images captured by a camera having at least one fisheye lens, wherein the circular images include 360 video data, and the video processor maps the circular images to rectangular regions of a picture having a fisheye video format, a data encoder configured to encode the picture to which the circular images are mapped, a metadata processor configured to generate signaling information about the 360 video data, wherein the signaling information includes fisheye video information for processing, by a receiver, the circular images, an encapsulation processor configured to encapsulate the encoded picture and the signaling information into a file, and a transmission unit configured to transmit the file.

The fisheye video information may include information for describing each of the circular images and information for describing each of the rectangular regions to which the circular images are mapped, wherein the information for describing the circular images and the information for describing the rectangular regions may be used by the receiver to extract 360 video data corresponding to an intersection of the circular images and the rectangular regions.

The information for describing the circular images may include information indicating an angle of view of the fisheye lens having captured the circular images and information indicating coordinates of a center point of a region occupied by the circular images in a 3D space, wherein the information for describing the rectangular regions may indicate a position of an upper leftmost point, width, and height of the rectangular regions to specify the rectangular regions and information indicating coordinates and a radius of a center point of the circular images mapped to the rectangular regions to specify the circular images.

The information for describing the rectangular regions may include region type information and additional region information having a different meaning according to the region type information, and the circular images mapped to the picture may include 360 stereoscopic video data, wherein the region type information may indicate a viewing position of a single circular image mapped to the rectangular region, and wherein the additional region information may indicate a viewing direction of the single circular image mapped to the rectangular region.

The region type information may further indicate whether a plurality of circular images having the same viewing direction is mapped to the rectangular region, wherein the additional region information may indicate the same viewing direction of the plurality of circular images mapped to the rectangular region.

The region type information may further indicate whether a plurality of circular images having the same viewing position is mapped to the rectangular region, wherein the additional region information may indicate the same viewing position of the plurality of circular images mapped to the rectangular region.

The video processor may not perform stitching or region-wise packing of the circular images in processing the circular images.

The fisheye video information may be generated in a form of a Dynamic Adaptive Streaming over HTTP (DASH) descriptor and transmitted in media presentation description (MPD) through a separate path different from a path for the file.

Advantageous Effects

The present invention can efficiently transmit 360 content in an environment supporting future hybrid broadcast using terrestrial broadcast networks and the Internet.

The present invention can propose methods for providing interactive experience in 360 content consumption of users.

The present invention can propose signaling methods for correctly reflecting intention of 360 content producers in 360 content consumption of users.

The present invention can propose methods of efficiently increasing transmission capacity and delivering necessary information in 360 content delivery.

DESCRIPTION OF DRAWINGS

FIG. 7 illustrates tiles according to one embodiment of the present invention.

FIG. 8 illustrates 360 video related metadata according to one embodiment of the present invention.

FIG. 11 illustrates overall operation of a DASH based adaptive streaming model according to one embodiment of the present invention.

FIG. 17 illustrates an embodiment of fisheye video information according to the present invention.

FIG. 18 illustrates an embodiment of region_type[i] and region_info[i] fields according to the present invention.

FIG. 19 illustrates an embodiment of a process of processing a fisheye 360 video on a reception side according to the present invention.

FIG. 20 illustrates another embodiment of the process of processing a fisheye 360 video on the reception side according to the present invention.

FIG. 21 illustrates another embodiment of the process of processing a fisheye 360 video on the reception side according to the present invention.

FIG. 22 illustrates another embodiment of the fisheye 360 video processing process on the reception side according to the present invention.

FIGS. 23 and 24 illustrate an embodiment of a circular image mapping process according to the present invention.

FIG. 25 illustrates another embodiment of the fisheye video information according to the present invention.

FIG. 26 illustrates another embodiment of a fisheye video delivery method according to the present invention.

FIG. 27 illustrates another embodiment of the fisheye video information according to the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

Figure 1:
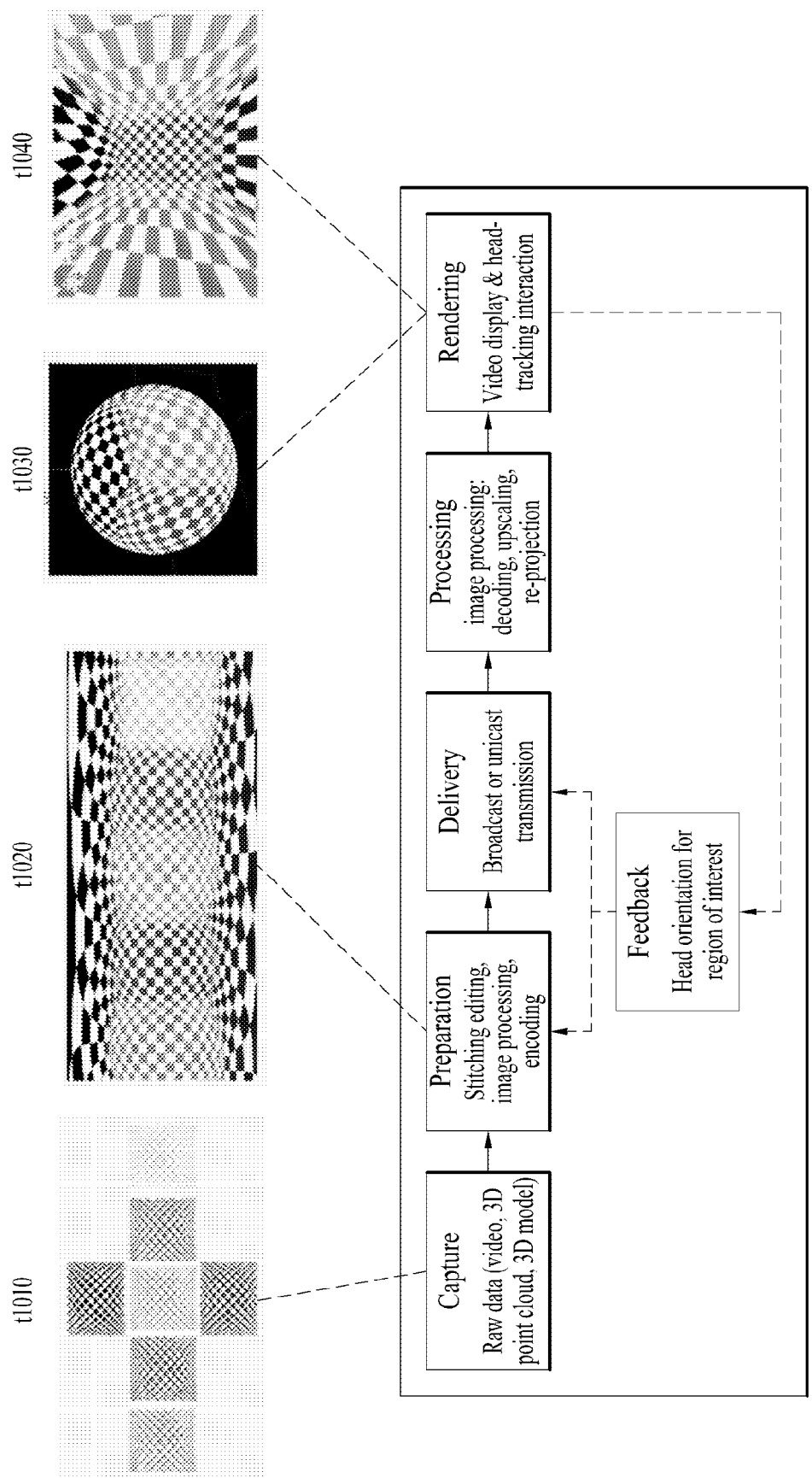
FIG. 1 illustrates an architecture for providing 360 video according to the present invention.

FIG. 1 illustrates an architecture for providing 360 video according to the present invention.

The present invention proposes a method for providing 360 content in order to provide Virtual Reality (VR) to users. VR refers to a technique or an environment for replicating an actual or virtual environment. VR artificially provides sensuous experiences to users and thus users can experience electronically projected environments.

360 content refers to convent for realizing and providing VR and may include 360 video and/or 360 audio. 360 video may refer to video or image content which is necessary to provide VR and is captured or reproduced in all directions (360 degrees). 360 video may refer to video or an image represented on 3D spaces in various forms according to 3D models. For example, 360 video can be represented on a spherical plane. 360 audio is audio content for providing VR and may refer to spatial audio content which can be recognized as content having an audio generation source located on a specific space. 360 content may be generated, processed and transmitted to users, and users may consume VR experiences using the 360 content.

The present invention proposes a method for effectively providing 360 degree video. To provide 360 video, first, 360 video may be captured using one or more cameras. The captured 360 video is transmitted through a series of processes, and a reception side may process received data into the original 360 video and render the 360 video. Accordingly, the 360 video can be provided to a user.

Specifically, a procedure for providing 360 video may include a capture process, a preparation process, a transmission process, a processing process, a rendering process and/or a feedback process.

The capture process may refer to a process of capturing images or videos for a plurality of viewpoints through one or more cameras. An image/video data t1010 shown in the figure can be generated through the capture process. Each plane of the shown image/video data t1010 may refer to an image/video for each viewpoint. The captured images/videos may be called raw data. In the capture process, metadata related to capture may be generated.

For capture, a special camera for VR may be used. When 360 video for a virtual space generated using a computer is provided according to an embodiment, capture using a camera may not be performed. In this case, the capture process may be replaced by a process of simply generating related data.

The preparation process may be a process of processing the captured images/videos and metadata generated in the capture process. The captured images/videos may be subjected to stitching, projection, region-wise packing and/or encoding in the preparation process.

First, the images/videos may pass through a stitching process. The stitching process may be a process of connecting the captured images/videos to create a single panorama image/video or a spherical image/video.

Then, the stitched images/videos may pass through a projection process. In the projection process, the stitched images/videos can be projected onto a 2D image. This 2D image may be called a 2D image frame. Projection on a 2D image may be represented as mapping to the 2D image. The projected image/video data can have a form of a 2D image t1020 as shown in the figure.

The video data projected onto the 2D image can pass through a region-wise packing process in order to increase video coding efficiency. Region-wise packing may refer to a process of dividing the video data projected onto the 2D image into regions and processing the regions. Here, regions may refer to regions obtained by dividing a 2D image on which 360 video data is projected. Such regions may be obtained by dividing the 2D image equally or randomly according to an embodiment. The regions may be divided depending on a projection scheme according to an embodiment. The region-wise packing process is an optional process and thus may be omitted in the preparation process.

According to an embodiment, this process may include a process of rotating the regions or rearranging the regions on the 2D image in order to increase video coding efficiency. For example, the regions can be rotated such that specific sides of regions are positioned in proximity to each other to increase coding efficiency.

According to an embodiment, this process may include a process of increasing or decreasing the resolution of a specific region in order to differentiate the resolution for regions of the 360 video. For example, the resolution of regions corresponding to a relatively important part of the 360 video can be increased to higher than other regions. The video data projected onto the 2D image or the region-wise packed video data can pass through an encoding process using a video codec.

According to an embodiment, the preparation process may additionally include an editing process. In the editing process, the image/video data before or after projection may be edited. In the preparation process, metadata with respect to stitching/projection/encoding/editing may be generated. In addition, metadata with respect to the initial viewpoint or ROI (region of interest) of the video data projected onto the 2D image may be generated.

The transmission process may be a process of processing and transmitting the image/video data and metadata which have passed through the preparation process. For transmission, processing according to an arbitrary transmission protocol may be performed. The data that has been processed for transmission may be delivered over a broadcast network and/or broadband. The data may be delivered to a reception side in an on-demand manner. The reception side may receive the data through various paths.

The processing process refers to a process of decoding the received data and re-projecting the projected image/video data on a 3D model. In this process, the image/video data projected onto the 2D image may be re-projected onto a 3D space. This process may be called mapping projection. Here, the 3D space on which the data is mapped may have a form depending on a 3D model. For example, 3D models may include a sphere, a cube, a cylinder and a pyramid.

According to an embodiment, the processing process may further include an editing process, an up-scaling process, etc. In the editing process, the image/video data before or after re-projection can be edited. When the image/video data has been reduced, the size of the image/video data can be increased through up-scaling of samples in the up-scaling process. As necessary, the size may be decreased through down-scaling.

The rendering process may refer to a process of rendering and displaying the image/video data re-projected onto the 3D space. Re-projection and rendering may be collectively represented as rendering on a 3D model. The image/video re-projected (or rendered) on the 3D model may have a form t1030 as shown in the figure. The form t1030 corresponds to a case in which the image/video data is re-projected onto a spherical 3D model. A user can view a region of the rendered image/video through a VR display or the like. Here, the region viewed by the user may have a form t1040 shown in the figure.

The feedback process may refer to a process of delivering various types of feedback information which can be acquired in the display process to a transmission side. Through the feedback process, interactivity in 360 video consumption can be provided. According to an embodiment, head orientation information, viewport information indicating a region currently viewed by a user, etc. can be delivered to the transmission side in the feedback process. According to an embodiment, the user may interact with content realized in a VR environment. In this case, information related to the interaction may be delivered to the transmission side or a service provider in the feedback process. According to an embodiment, the feedback process may not be performed.

The head orientation information may refer to information about the position, angle and motion of a user's head. On the basis of this information, information about a region of 360 video currently viewed by the user, that is, viewport information can be calculated.

The viewport information may be information about a region of 360 video currently viewed by a user. Gaze analysis may be performed using the viewport information to check a manner in which the user consumes 360 video, a region of the 360 video at which the user gazes, and how long the user gazes at the region. Gaze analysis may be performed by the reception side and the analysis result may be delivered to the transmission side through a feedback channel. A device such as a VR display may extract a viewport region on the basis of the position/direction of a user's head, vertical or horizontal FOV supported by the device, etc.

According to an embodiment, the aforementioned feedback information may be consumed on the reception side as well as being delivered to the transmission side. That is, decoding, re-projection and rendering processes of the reception side can be performed using the aforementioned feedback information. For example, only 360 video corresponding to the region currently viewed by the user can be preferentially decoded and rendered using the head orientation information and/or the viewport information.

Here, a viewport or a viewport region can refer to a region of 360 video currently viewed by a user. A viewpoint is a point in 360 video which is viewed by the user and may refer to a center point of a viewport region. That is, a viewport is a region based on a viewpoint, and the size and form of the region can be determined by FOV (field of view) which will be described below.

In the above-described architecture for providing 360 video, image/video data which is subjected to a series of capture/projection/encoding/transmission/decoding/re-projection/rendering processes can be called 360 video data. The term "360 video data" may be used as the concept including metadata or signaling information related to such image/video data.

Figure 2:
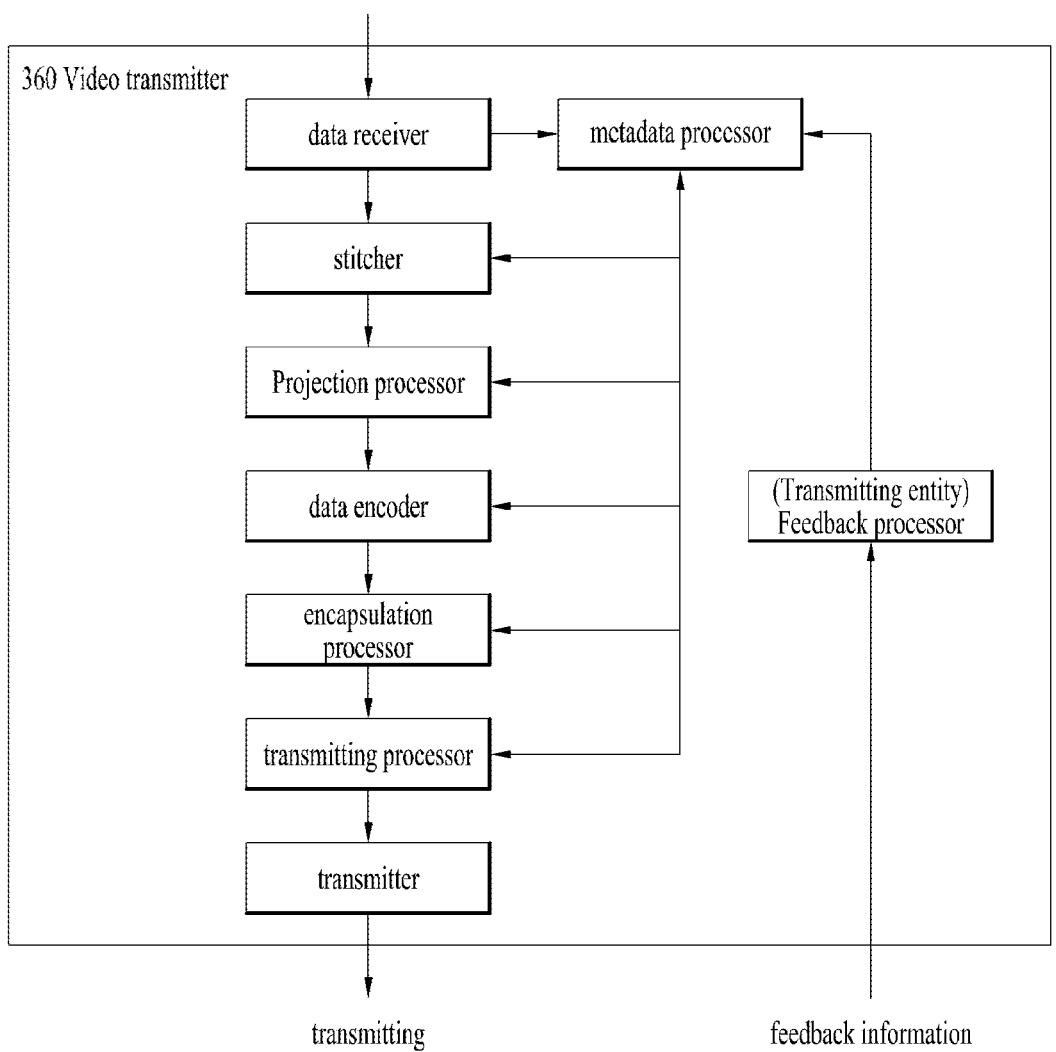
FIG. 2 illustrates a 360 video transmission apparatus according to one aspect of the present invention.

FIG. 2 illustrates a 360 video transmission apparatus according to one aspect of the present invention.

According to one aspect, the present invention may relate to a 360 video transmission apparatus. The 360 video transmission apparatus according to the present invention may perform operations related to the above-described preparation process to the transmission process. The 360 video transmission apparatus according to the present invention may include a data input unit, a stitcher, a projection processor, a region-wise packing processor (not shown), a metadata processor, a (transmission side) feedback processor, a data encoder, an encapsulation processor, a transmission processor and/or a transmitter as internal/external elements.

The data input unit may receive captured images/videos for respective viewpoints. The images/videos for the viewpoints may be images/videos captured by one or more cameras. In addition, the data input unit may receive metadata generated in the capture process. The data input unit may deliver the received images/videos for the viewpoints to the stitcher and deliver the metadata generated in the capture process to a signaling processor.

The stitcher may stitch the captured images/videos for the viewpoints. The stitcher may deliver the stitched 360 video data to the projection processor. The stitcher may receive necessary metadata from the metadata processor and use the metadata for stitching operation as necessary. The stitcher may deliver the metadata generated in the stitching process to the metadata processor. The metadata in the stitching process may include information indicating whether stitching has been performed, a stitching type, etc.

The projection processor may project the stitched 360 video data on a 2D image. The projection processor may perform projection according to various schemes which will be described below. The projection processor may perform mapping in consideration of the depth of 360 video data for each viewpoint. The projection processor may receive metadata necessary for projection from the metadata processor and use the metadata for the projection operation as necessary. The projection processor may deliver metadata generated in the projection process to the metadata processor. The metadata of the projection process may include a projection scheme type.

The region-wise packing processor (not shown) may perform the aforementioned region-wise packing process. That is, the region-wise packing processor may perform a process of dividing the projected 360 video data into regions, rotating or rearranging the regions or changing the resolution of each region. As described above, the region-wise packing process is an optional process, and when region-wise packing is not performed, the region-wise packing processor can be omitted. The region-wise packing processor may receive metadata necessary for region-wise packing from the metadata processor and use the metadata for the region-wise packing operation as necessary. The metadata of the region-wise packing processor may include a degree to which each region is rotated, the size of each region, etc.

The aforementioned stitcher, the projection processor and/or the region-wise packing processor may be realized by one hardware component according to an embodiment.

The metadata processor may process metadata which can be generated in the capture process, the stitching process, the projection process, the region-wise packing process, the encoding process, the encapsulation process and/or the processing process for transmission. The metadata processor may generate 360 video related metadata using such metadata. According to an embodiment, the metadata processor may generate the 360 video related metadata in the form of a signaling table. The 360 video related metadata may be called metadata or 360 video related signaling information according to the signaling context. Furthermore, the metadata processor may deliver acquired or generated metadata to internal elements of the 360 video transmission apparatus as necessary. The metadata processor may deliver the 360 video related metadata to the data encoder, the encapsulation processor and/or the transmission processor such that the metadata can be transmitted to the reception side.

The data encoder may encode the 360 video data projected onto the 2D image and/or the region-wise packed 360 video data. The 360 video data may be encoded in various formats.

The encapsulation processor may encapsulate the encoded 360 video data and/or 360 video related metadata into a file. Here, the 360 video related metadata may be delivered from the metadata processor. The encapsulation processor may encapsulate the data in a file format such as ISOBMFF, CFF or the like or process the data into a DASH segment. The encapsulation processor may include the 360 video related metadata in a file format according to an embodiment. For example, the 360 video related metadata can be included in boxes of various levels in an ISOBMFF file format or included as data in an additional track in a file. In an embodiment, the encapsulation processor may encapsulate the 360 video related metadata into a file.

The transmission processor may perform processing for transmission on the 360 video data d in a file format. The transmission processor may process the 360 video data according to an arbitrary transmission protocol. The processing for transmission may include processing for delivery through a broadcast network and processing for delivery over a broadband. According to an embodiment, the transmission processor may receive 360 video related metadata from the metadata processor in addition to the 360 video data and perform processing for transmission on the 360 video related metadata.

The transmission unit may transmit the processed 360 video data and/or the 360 video related metadata over a broadcast network and/or broadband. The transmission unit may include an element for transmission over a broadcast network and an element for transmission over a broadband.

According to an embodiment of the present invention, the 360 video transmission apparatus may further include a data storage unit (not shown) as an internal/external element. The data storage unit may store the encoded 360 video data and/or 360 video related metadata before delivery to the transmission processor. Such data may be stored in a file format such as ISOBMFF. When 360 video is transmitted in real time, the data storage unit may not be used. However, 360 video is delivered on demand, in non-real time or over a broadband, encapsulated 360 data may be stored in the data storage unit for a predetermined period and then transmitted.

According to another embodiment of the present invention, the 360 video transmission apparatus may further include a (transmission side) feedback processor and/or a network interface (not shown) as internal/external elements. The network interface may receive feedback information from a 360 video reception apparatus according to the present invention and deliver the feedback information to the (transmission side) feedback processor. The feedback processor may deliver the feedback information to the stitcher, the projection processor, the region-wise packing processor, the data encoder, the encapsulation processor, the metadata processor and/or the transmission processor. The feedback information may be delivered to the metadata processor and then delivered to each internal element according to an embodiment. Upon reception of the feedback information, internal elements may reflect the feedback information in 360 video data processing.

According to another embodiment of the 360 video transmission apparatus of the present invention, the region-wise packing processor may rotate regions and map the regions on a 2D image. Here, the regions may be rotated in different directions at different angles and mapped on the 2D image. The regions may be rotated in consideration of neighboring parts and stitched parts of the 360 video data on the spherical plane before projection. Information about rotation of the regions, that is, rotation directions and angles may be signaled using 360 video related metadata. According to another embodiment of the 360 video transmission apparatus according to the present invention, the data encoder may perform encoding differently on respective regions. The data encoder may encode a specific region with high quality and encode other regions with low quality. The feedback processor at the transmission side may deliver the feedback information received from the 360 video reception apparatus to the data encoder such that the data encoder can use encoding methods differentiated for regions. For example, the feedback processor can deliver viewport information received from the reception side to the data encoder. The data encoder may encode regions including a region indicated by the viewport information with higher quality (UHD) than other regions.

According to another embodiment of the 360 video transmission apparatus according to the present invention, the transmission processor may perform processing for transmission differently on respective regions. The transmission processor may apply different transmission parameters (modulation orders, code rates, etc.) to regions such that data delivered for the regions have different robustnesses.

Here, the feedback processor may deliver the feedback information received from the 360 video reception apparatus to the transmission processor such that the transmission processor can perform transmission processing differentiated for respective regions. For example, the feedback processor can deliver viewport information received from the reception side to the transmission processor. The transmission processor may perform transmission processing on regions including a region indicated by the viewport information such that the regions have higher robustness than other regions.

The aforementioned internal/external elements of the 360 video transmission apparatus according to the present invention may be hardware elements. According to an embodiment, the internal/external elements may be modified, omitted, replaced by other elements or integrated with other elements. According to an embodiment, additional elements may be added to the 360 video transmission apparatus.

Figure 3:
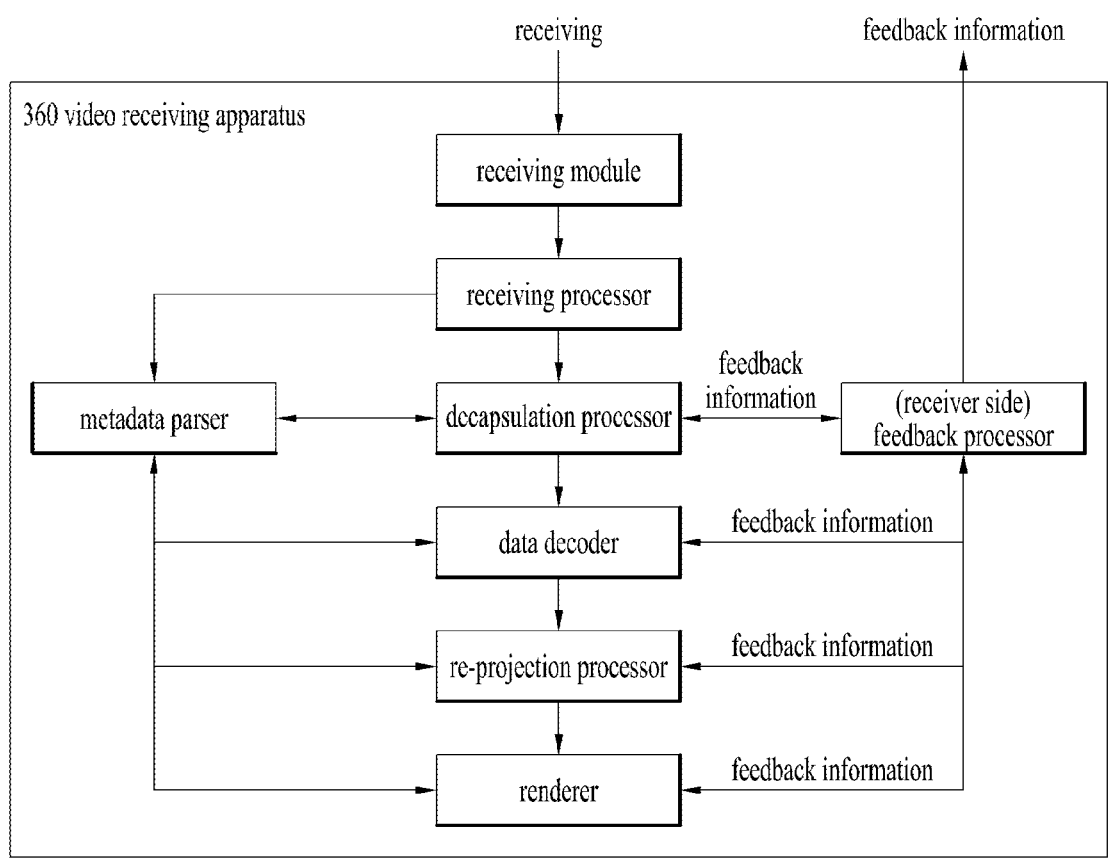
FIG. 3 illustrates a 360 video reception apparatus according to another aspect of the present invention.

FIG. 3 illustrates a 360 video reception apparatus according to another aspect of the present invention.

According to another aspect, the present invention may relate to a 360 video reception apparatus. The 360 video reception apparatus according to the present invention may perform operations related to the above-described processing process and/or the rendering process. The 360 video reception apparatus according to the present invention may include a reception unit, a reception processor, a decapsulation processor, a data decoder, a metadata parser, a (reception side) feedback processor, a re-projection processor and/or a renderer as internal/external elements.

The reception unit may receive 360 video data transmitted from the 360 video transmission apparatus according to the present invention. The reception unit may receive the 360 video data through a broadcast network or a broadband depending on a transmission channel.

The reception processor may perform processing according to a transmission protocol on the received 360 video data. The reception processor may perform a reverse of the process of the transmission processor. The reception processor may deliver the acquired 360 video data to the decapsulation processor and deliver acquired 360 video related metadata to the metadata parser. The 360 video related metadata acquired by the reception processor may have a form of a signaling table.

The decapsulation processor may decapsulate the 360 video data in a file format received from the reception processor. The decapsulation processor may decapsulate files in ISOBMFF to acquire 360 video data and 360 video related metadata. The acquired 360 video data may be delivered to the data decoder and the acquired 360 video related metadata may be delivered to the metadata parser. The 360 video related metadata acquired by the decapsulation processor may have a form of box or track in a file format. The decapsulation processor may receive metadata necessary for decapsulation from the metadata parser as necessary.

The data decoder may decode the 360 video data. The data decoder may receive metadata necessary for decoding from the metadata parser. The 360 video related metadata acquired in the data decoding process may be delivered to the metadata parser.

The metadata parser may parse/decode the 360 video related metadata. The metadata parser may deliver the acquired metadata to the data decapsulation processor, the data decoder, the re-projection processor and/or the renderer.

The re-projection processor may re-project the decoded 360 video data. The re-projection processor may re-project the 360 video data on a 3D space. The 3D space may have different forms depending on used 3D models. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360 video data corresponding to a specific region on the 3D space using the metadata necessary for re-projection.

The renderer may render the re-projected 360 video data. This may be represented as rendering of the 360 video data on a 3D space as described above. When two processes are simultaneously performed in this manner, the re-projection processor and the renderer may be integrated and the processes may be performed in the renderer. According to an embodiment, the renderer may render only a region viewed by the user according to view information of the user.

The user may view part of the rendered 360 video through a VR display. The VR display is a device for reproducing 360 video and may be included in the 360 video reception apparatus (tethered) or connected to the 360 video reception apparatus as a separate device (un-tethered).

According to an embodiment of the present invention, the 360 video reception apparatus may further include a (reception side) feedback processor and/or a network interface (not shown) as internal/external elements. The feedback processor may acquire feedback information from the renderer, the re-projection processor, the data decoder, the decapsulation processor and/or the VR display and process the feedback information. The feedback information may include viewport information, head orientation information, gaze information, etc. The network interface may receive the feedback information from the feedback processor and transmit the same to the 360 video transmission apparatus.

As described above, the feedback information may be used by the reception side in addition to being delivered to the transmission side. The reception side feedback processor can deliver the acquired feedback information to internal elements of the 360 video reception apparatus such that the feedback information is reflected in a rendering process. The reception side feedback processor can deliver the feedback information to the renderer, the re-projection processor, the data decoder and/or the decapsulation processor. For example, the renderer can preferentially render a region viewed by the user using the feedback information. In addition, the decapsulation processor and the data decoder can preferentially decapsulate and decode a region viewed by the user or a region to be viewed by the user.

The internal/external elements of the 360 video reception apparatus according to the present invention may be hardware elements. According to an embodiment, the internal/external elements may be modified, omitted, replaced by other elements or integrated with other elements. According to an embodiment, additional elements may be added to the 360 video reception apparatus.

Another aspect of the present invention may relate to a method for transmitting 360 video and a method of receiving 360 video. The methods of transmitting/receiving 360 video according to the present invention may be performed by the above-described 360 video transmission/reception apparatuses or embodiments thereof.

The aforementioned embodiments of the 360 video transmission/reception apparatuses and embodiments of the internal/external elements thereof may be combined. For example, embodiments of the projection processor and embodiments of the data encoder can be combined to create as many embodiments of the 360 video transmission apparatus as the number of the embodiments. The combined embodiments are also included in the scope of the present invention.

Figure 4:
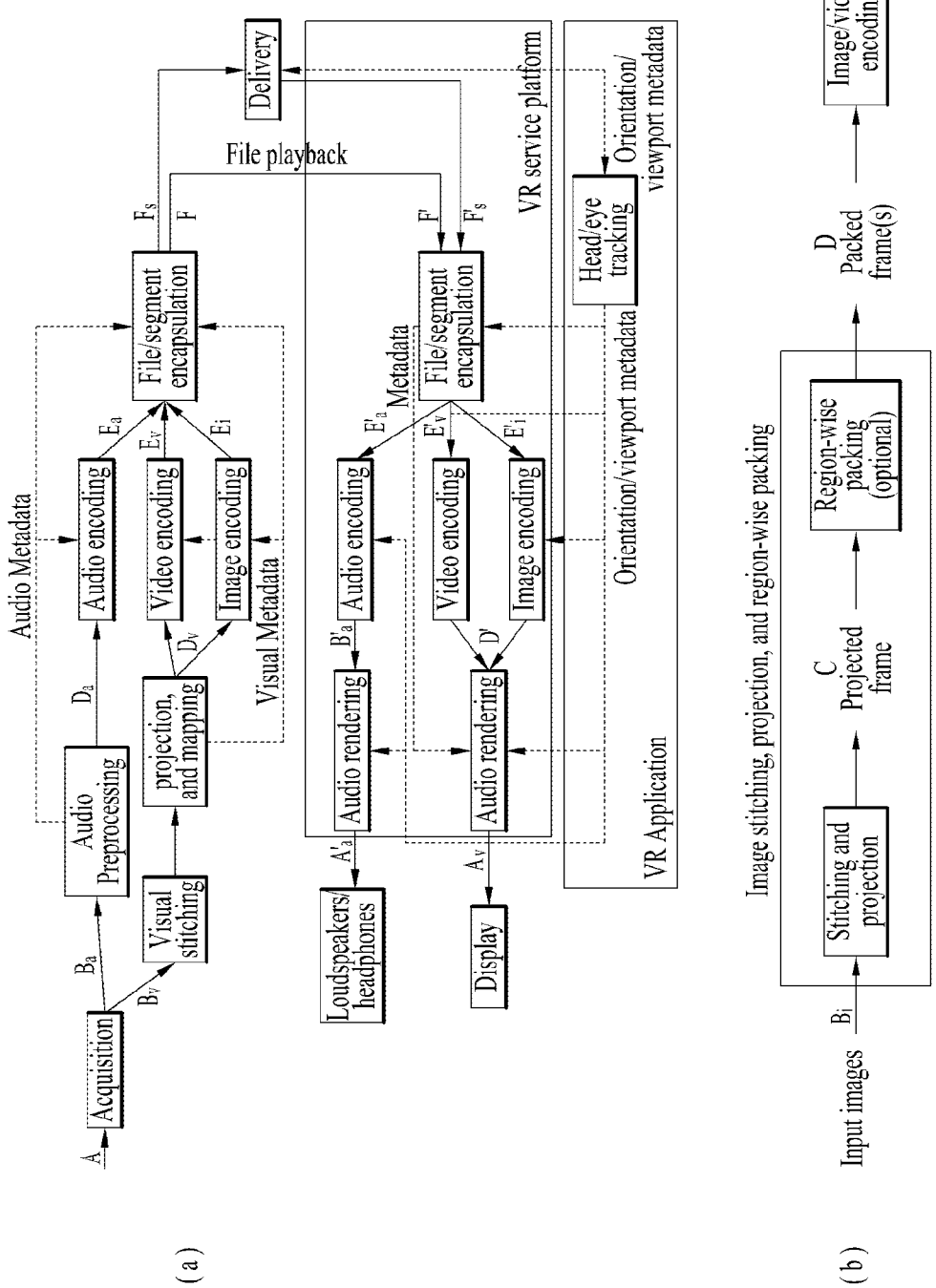
FIG. 4 illustrates a 360 video transmission apparatus/360 video reception apparatus according to another embodiment of the present invention.

FIG. 4 illustrates a 360 video transmission apparatus/360 video reception apparatus according to another embodiment of the present invention.

As described above, 360 content may be provided according to the architecture shown in (a). The 360 content may be provided in the form of a file or in the form of a segment based download or streaming service such as DASH. Here, the 360 content may be called VR content.

As described above, 360 video data and/or 360 audio data may be acquired.

The 360 audio data may be subjected to audio preprocessing and audio encoding. Through these processes, audio related metadata may be generated, and the encoded audio and audio related metadata may be subjected to processing for transmission (file/segment encapsulation).

The 360 video data may pass through the aforementioned processes. The stitcher of the 360 video transmission apparatus may stitch the 360 video data (visual stitching). This process may be omitted and performed on the reception side according to an embodiment. The projection processor of the 360 video transmission apparatus may project the 360 video data on a 2D image (projection and mapping (packing)).

The stitching and projection processes are shown in (b) in detail. In (b), when the 360 video data (input images) is delivered, stitching and projection may be performed thereon. The projection process may be regarded as projecting the stitched 360 video data on a 3D space and arranging the projected 360 video data on a 2D image. In the specification, this process may be represented as projecting the 360 video data on a 2D image. Here, the 3D space may be a sphere or a cube. The 3D space may be identical to the 3D space used for re-projection on the reception side.

The 2D image may also be called a projected frame C. Region-wise packing may be optionally performed on the 2D image. When region-wise packing is performed, the positions, forms and sizes of regions may be indicated such that the regions on the 2D image can be mapped on a packed frame D. When region-wise packing is not performed, the projected frame may be identical to the packed frame. Regions will be described below. The projection process and the region-wise packing process may be represented as projecting regions of the 360 video data on a 2D image. The 360 video data may be directly converted into the packed frame without an intermediate process according to design.

In (a), the projected 360 video data may be image-encoded or video-encoded. Since the same content may be present for different viewpoints, the same content may be encoded into different bit streams. The encoded 360 video data may be processed into a file format such as ISOBMFF according to the aforementioned encapsulation processor. Alternatively, the encapsulation processor may process the encoded 360 video data into segments. The segments may be included in an individual track for DASH based transmission.

Along with processing of the 360 video data, 360 video related metadata may be generated as described above. This metadata may be included in a video bitstream or a file format and delivered. The metadata may be used for encoding, file format encapsulation, processing for transmission, etc.

The 360 audio/video data may pass through processing for transmission according to the transmission protocol and then be transmitted. The aforementioned 360 video reception apparatus may receive the 360 audio/video data over a broadcast network or broadband.

In (a), a VR service platform may correspond to an embodiment of the aforementioned 360 video reception apparatus. In (a), loudspeakers/headphones, display and head/eye tracking components are performed by an external device or a VR application of the 360 video reception apparatus. According to an embodiment, the 360 video reception apparatus may include all of these components. According to an embodiment, the head/eye tracking components may correspond to the aforementioned reception side feedback processor.

The 360 video reception apparatus may perform processing for reception (file/segment decapsulation) on the 360 audio/video data. The 360 audio data may be subjected to audio decoding and audio rendering and then provided to the user through a speaker/headphone.

The 360 video data may be subjected to image decoding or video decoding and visual rendering and provided to the user through a display. Here, the display may be a display supporting VR or a normal display.

As described above, the rendering process may be regarded as a process of re-projecting 360 video data on a 3D space and rendering the re-projected 360 video data. This may be represented as rendering of the 360 video data on the 3D space.

The head/eye tracking components may acquire and process head orientation information, gaze information and viewport information of a user. This has been described above.

The reception side may include a VR application which communicates with the aforementioned processes of the reception side.

Figure 5:
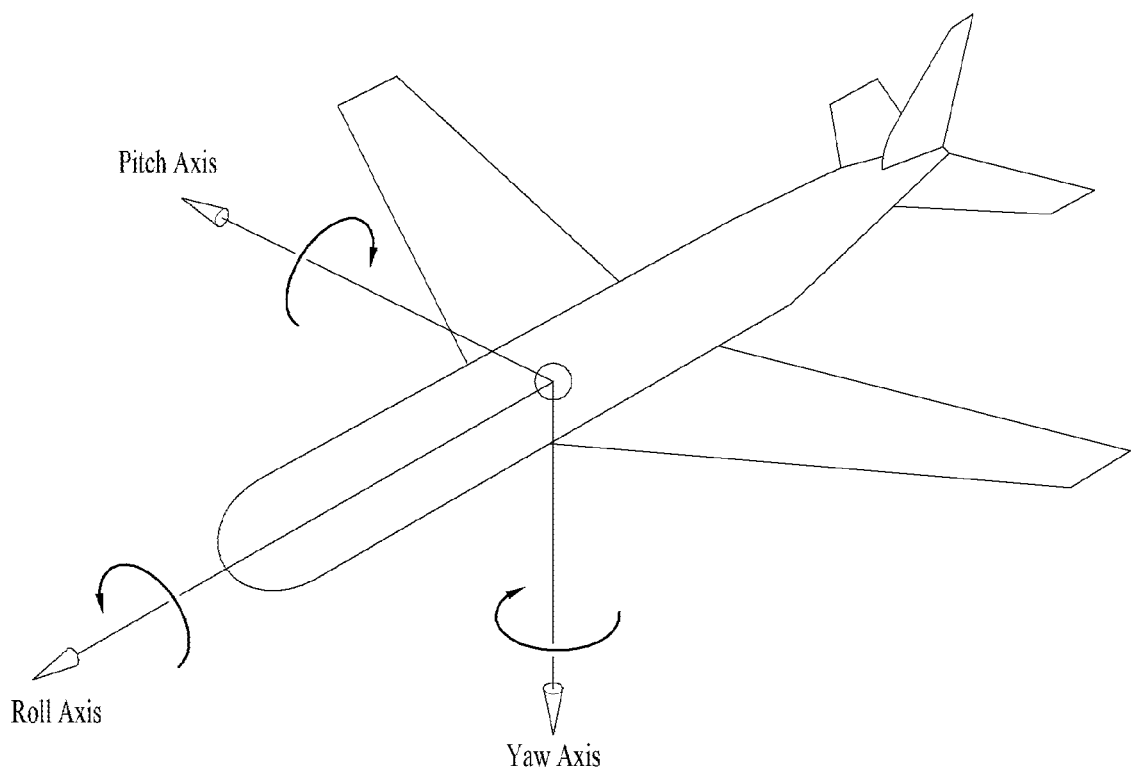
FIG. 5 illustrates the concept of aircraft principal axes for describing a 3D space according to the present invention.

FIG. 5 illustrates the concept of aircraft principal axes for describing a 3D space of the present invention.

In the present invention, the concept of aircraft principal axes may be used to represent a specific point, position, direction, spacing and region in a 3D space.

That is, the concept of aircraft principal axes may be used to describe a 3D space before projection or after re-projection and to signal the same. According to an embodiment, a method using X, Y and Z axes or a spherical coordinate system may be used.

An aircraft can freely rotate in the three dimension. Axes which form the three dimension are called pitch, yaw and roll axes. In the specification, these may be represented as pitch, yaw and roll or a pitch direction, a yaw direction and a roll direction.

The pitch axis may refer to a reference axis of a direction in which the front end of the aircraft rotates up and down. In the shown concept of aircraft principal axes, the pitch axis can refer to an axis connected between wings of the aircraft.

The yaw axis may refer to a reference axis of a direction in which the front end of the aircraft rotates to the left/right. In the shown concept of aircraft principal axes, the yaw axis can refer to an axis connected from the top to the bottom of the aircraft.

The roll axis may refer to an axis connected from the front end to the tail of the aircraft in the shown concept of aircraft principal axes, and rotation in the roll direction can refer to rotation based on the roll axis.

As described above, a 3D space in the present invention can be described using the concept of the pitch, yaw and roll.

Figure 6:
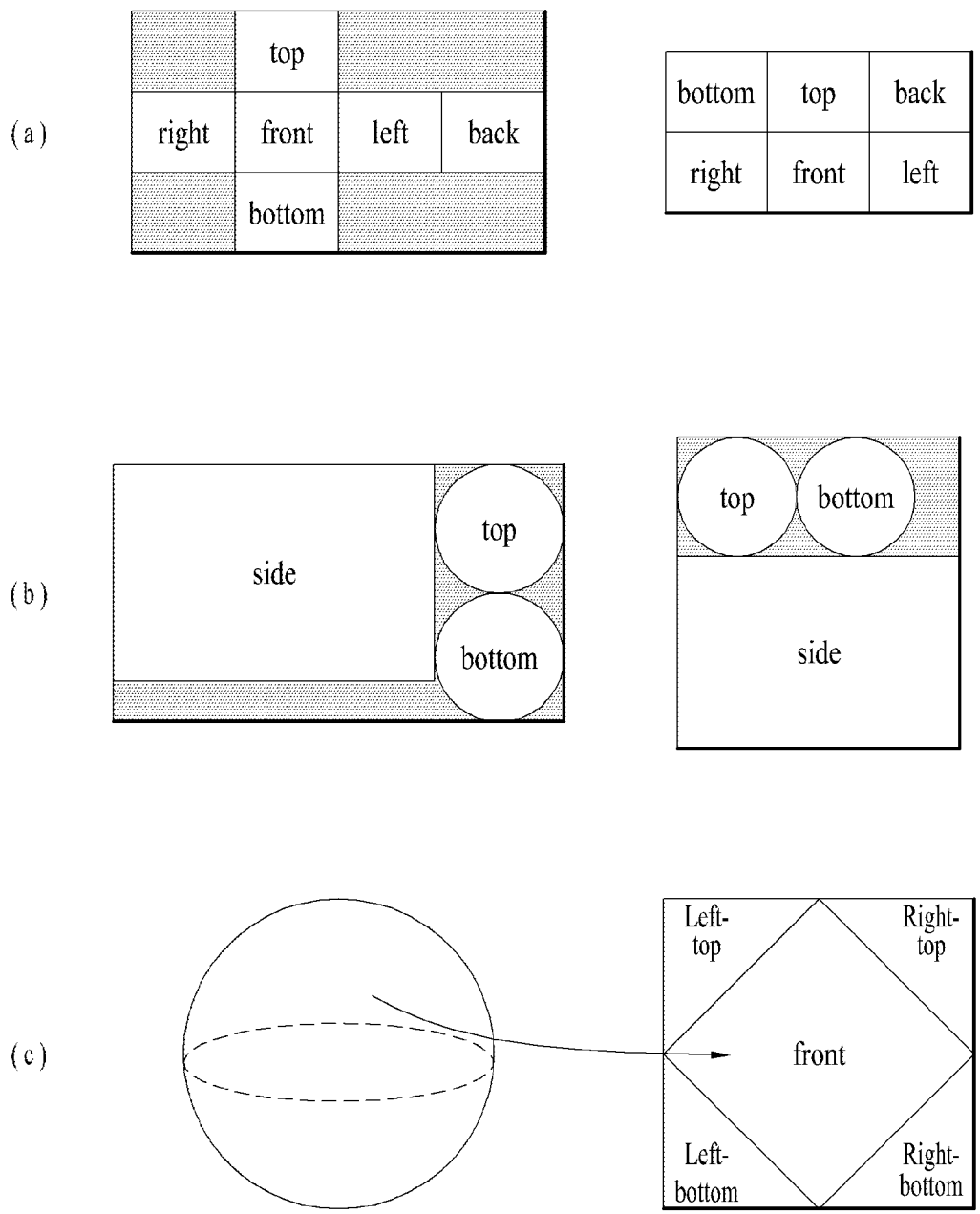
FIG. 6 illustrates projection schemes according to one embodiment of the present invention.

FIG. 6 illustrates projection schemes according to an embodiment of the present invention.

As described above, the projection processor of the 360 video transmission apparatus according to the present invention may project stitched 360 video data on a 2D image. In this process, various projection schemes can be used.

According to another embodiment of the 360 video transmission apparatus according to the present invention, the projection processor may perform projection using a cubic projection scheme. For example, stitched video data can be represented on a spherical plane. The projection processor may segment the 360 video data into faces of a cube and project the same on the 2D image. The 360 video data on the spherical plane may correspond to the faces of the cube and be projected onto the 2D image as shown in (a).

According to another embodiment of the 360 video transmission apparatus according to the present invention, the projection processor may perform projection using a cylindrical projection scheme. Similarly, if stitched video data can be represented on a spherical plane, the projection processor can segment the 360 video data into parts of a cylinder and project the same on the 2D image. The 360 video data on the spherical plane can correspond to the side, top and bottom of the cylinder and be projected onto the 2D image as shown in (b).

According to another embodiment of the 360 video transmission apparatus according to the present invention, the projection processor may perform projection using a pyramid projection scheme. Similarly, if stitched video data can be represented on a spherical plane, the projection processor can regard the 360 video data as a pyramid form, segment the 360 video data into faces of the pyramid and project the same on the 2D image. The 360 video data on the spherical plane can correspond to the front, left top, left bottom, right top and right bottom of the pyramid and be projected onto the 2D image as shown in (c).

According to an embodiment, the projection processor may perform projection using an equirectangular projection scheme and a panoramic projection scheme in addition to the aforementioned schemes.

As described above, regions may refer to regions obtained by dividing a 2D image on which 360 video data is projected. Such regions need not correspond to respective faces of the 2D image projected according to a projection scheme. However, regions may be divided such that the faces of the projected 2D image correspond to the regions and region-wise packing may be performed according to an embodiment. Regions may be divided such that a plurality of faces may correspond to one region or one face may correspond to a plurality of regions according to an embodiment. In this case, the regions may depend on projection schemes. For example, the top, bottom, front, left, right and back sides of the cube can be respective regions in (a). The side, top and bottom of the cylinder can be respective regions in (b). The front, left top, left bottom, right top and right bottom sides of the pyramid can be respective regions in (c).

FIG. 7 illustrates tiles according to an embodiment of the present invention.

360 video data projected onto a 2D image or region-wise packed 360 video data may be divided into one or more tiles. (a) shows that one 2D image is divided into 16 tiles. Here, the 2D image may be the aforementioned projected frame or packed frame. According to another embodiment of the 360 video transmission apparatus of the present invention, the data encoder may independently encode the tiles.

The aforementioned region-wise packing can be discriminated from tiling. The aforementioned region-wise packing may refer to a process of dividing 360 video data projected onto a 2D image into regions and processing the regions in order to increase coding efficiency or adjusting resolution. Tiling may refer to a process through which the data encoder divides a projected frame or a packed frame into tiles and independently encode the tiles. When 360 video is provided, a user does not simultaneously use all parts of the 360 video. Tiling enables only tiles corresponding to important part or specific part, such as a viewport currently viewed by the user, to be transmitted to or consumed by the reception side on a limited bandwidth. Through tiling, a limited bandwidth can be used more efficiently and the reception side can reduce computational load compared to a case in which the entire 360 video data is processed simultaneously.

A region and a tile are discriminated from each other and thus they need not be identical. However, a region and a tile may refer to the same area according to an embodiment. Region-wise packing may be performed based on tiles and thus regions can correspond to tiles according to an embodiment. Furthermore, when sides according to a projection scheme correspond to regions, each side, region and tile according to the projection scheme may refer to the same area according to an embodiment. A region may be called a VR region and a tile may be called a tile region according to context.

ROI (Region of Interest) may refer to a region of interest of users, which is provided by a 360 content provider. When the 360 content provider produces 360 video, the 360 content provider can produce the 360 video in consideration of a specific region which is expected to be a region of interest of users. According to an embodiment, ROI may correspond to a region in which important content of the 360 video is reproduced.

According to another embodiment of the 360 video transmission/reception apparatuses of the present invention, the reception side feedback processor may extract and collect viewport information and deliver the same to the transmission side feedback processor. In this process, the viewport information can be delivered using network interfaces of both sides. In the 2D image shown in (a), a viewport t6010 is displayed. Here, the viewport may be displayed over nine tiles of the 2D images.

In this case, the 360 video transmission apparatus may further include a tiling system. According to an embodiment, the tiling system may be located following the data encoder (b), may be included in the aforementioned data encoder or transmission processor, or may be included in the 360 video transmission apparatus as a separate internal/external element.

The tiling system may receive viewport information from the transmission side feedback processor. The tiling system may select only tiles included in a viewport region and transmit the same. In the 2D image shown in (a), only nine tiles including the viewport region t6010 among 16 tiles can be transmitted. Here, the tiling system may transmit tiles in a unicast manner over a broadband because the viewport region is different for users.

In this case, the transmission side feedback processor may deliver the viewport information to the data encoder. The data encoder may encode the tiles including the viewport region with higher quality than other tiles.

Furthermore, the transmission side feedback processor may deliver the viewport information to the metadata processor. The metadata processor may deliver metadata related to the viewport region to each internal element of the 360 video transmission apparatus or include the metadata in 360 video related metadata.

By using this tiling method, transmission bandwidths can be saved and processes differentiated for tiles can be performed to achieve efficient data processing/transmission.

The above-described embodiments related to the viewport region can be applied to specific regions other than the viewport region in a similar manner. For example, the aforementioned processes performed on the viewport region can be performed on a region determined to be a region in which users are interested through the aforementioned gaze analysis, ROI, and a region (initial view, initial viewpoint) initially reproduced when a user views 360 video through a VR display.

According to another embodiment of the 360 video transmission apparatus of the present invention, the transmission processor may perform processing for transmission differently on tiles. The transmission processor may apply different transmission parameters (modulation orders, code rates, etc.) to tiles such that data delivered for the tiles has different robustnesses.

Here, the transmission side feedback processor may deliver feedback information received from the 360 video reception apparatus to the transmission processor such that the transmission processor can perform transmission processing differentiated for tiles. For example, the transmission side feedback processor can deliver the viewport information received from the reception side to the transmission processor. The transmission processor can perform transmission processing such that tiles including the corresponding viewport region have higher robustness than other tiles.

FIG. 8 illustrates 360 video related metadata according to an embodiment of the present invention.

The aforementioned 360 video related metadata may include various types of metadata related to 360 video. The 360 video related metadata may be called 360 video related signaling information according to context. The 360 video related metadata may be included in an additional signaling table and transmitted, included in a DASH MPD and transmitted, or included in a file format such as ISOBMFF in the form of box and delivered. When the 360 video related metadata is included in the form of box, the 360 video related metadata may be included in various levels such as a file, fragment, track, sample entry, sample, etc. and may include metadata about data of the corresponding level.

According to an embodiment, part of the metadata, which will be described below, may be configured in the form of a signaling table and delivered, and the remaining part may be included in a file format in the form of a box or a track.

According to an embodiment of the 360 video related metadata, the 360 video related metadata may include basic metadata related to a projection scheme, stereoscopic related metadata, initial view/initial viewpoint related metadata, ROI related metadata, FOV (Field of View) related metadata and/or cropped region related metadata. According to an embodiment, the 360 video related metadata may include additional metadata in addition to the aforementioned metadata.

Embodiments of the 360 video related metadata according to the present invention may include at least one of the aforementioned basic metadata, stereoscopic related metadata, initial view/initial viewpoint related metadata, ROI related metadata, FOV related metadata, cropped region related metadata and/or additional metadata. Embodiments of the 360 video related metadata according to the present invention may be configured in various manners depending on the number of cases of metadata included therein. According to an embodiment, the 360 video related metadata may further include additional metadata in addition to the aforementioned metadata.

The basic metadata may include 3D model related information, projection scheme related information and the like. The basic metadata may include a vr_geometry field, a projection_scheme field, etc. According to an embodiment, the basic metadata may further include additional information.

The vr_geometry field can indicate the type of a 3D model supported by the corresponding 360 video data. When the 360 video data is re-projected onto a 3D space as described above, the 3D space may have a form according to a 3D model indicated by the vr_geometry field. According to an embodiment, a 3D model used for rendering may differ from the 3D model used for re-projection, indicated by the vr_geometry field. In this case, the basic metadata may further include a field which indicates the 3D model used for rendering. When the field has values of 0, 1, 2 and 3, the 3D space can conform to 3D models of a sphere, a cube, a cylinder and a pyramid. When the field has the remaining values, the field can be reserved for future use. According to an embodiment, the 360 video related metadata may further include detailed information about the 3D model indicated by the field. Here, the detailed information about the 3D model may refer to the radius of a sphere, the height of a cylinder, etc. for example. This field may be omitted.

The projection_scheme field can indicate a projection scheme used when the 360 video data is projected onto a 2D image. When the field has values of 0, 1, 2, 3, 4, and 5, the field indicates that the equirectangular projection scheme, cubic projection scheme, cylindrical projection scheme, tile-based projection scheme, pyramid projection scheme and panoramic projection scheme are used. When the field has a value of 6, the field indicates that the 360 video data is directly projected onto the 2D image without stitching. When the field has the remaining values, the field can be reserved for future use. According to an embodiment, the 360 video related metadata may further include detailed information about regions generated according to a projection scheme specified by the field. Here, the detailed information about regions may refer to information indicating whether regions have been rotated, the radius of the top region of a cylinder, etc. for example.

The stereoscopic related metadata may include information about 3D related attributes of the 360 video data. The stereoscopic related metadata may include an is_stereoscopic field and/or a stereo_mode field. According to an embodiment, the stereoscopic related metadata may further include additional information.

The is_stereoscopic field can indicate whether the 360 video data supports 3D. When the field is 1, the 360 video data supports 3D. When the field is 0, the 360 video data does not support 3D. This field may be omitted.

The stereo_mode field can indicate 3D layout supported by the corresponding 360 video. Whether the 360 video supports 3D can be indicated only using this field. In this case, the is_stereoscopic field can be omitted. When the field is 0, the 360 video may be a mono mode. That is, the projected 2D image can include only one mono view. In this case, the 360 video may not support 3D.

When this field is set to 1 and 2, the 360 video can conform to left-right layout and top-bottom layout. The left-right layout and top-bottom layout may be called a side-by-side format and a top-bottom format. In the case of the left-right layout, 2D images on which left image/right image are projected can be positioned at the left/right on an image frame. In the case of the top-bottom layout, 2D images on which left image/right image are projected can be positioned at the top/bottom on an image frame. When the field has the remaining values, the field can be reserved for future use.

The initial view/initial viewpoint related metadata may include information about a view (initial view) which is viewed by a user when initially reproducing 360 video. The initial view/initial viewpoint related metadata may include an initial_view_yaw_degree field, an initial_view_pitch_degree field and/or an initial_view_roll_degree field. According to an embodiment, the initial view/initial viewpoint related metadata may further include additional information.

The initial_view_yaw_degree field, initial_view_pitch_degree field and initial_view_roll_degree field can indicate an initial view when the 360 video is reproduced. That is, the center point of a viewport which is initially viewed when the 360 video is reproduced can be indicated by these three fields. The fields can indicate the center point using a direction (sign) and a degree (angle) of rotation on the basis of yaw, pitch and roll axes. Here, the viewport which is initially viewed when the 360 video is reproduced according to FOV. The width and height of the initial viewport based on the indicated initial view may be determined through FOV. That is, the 360 video reception apparatus can provide a specific region of the 360 video as an initial viewport to a user using the three fields and FOV information.

According to an embodiment, the initial view indicated by the initial view/initial viewpoint related metadata may be changed per scene. That is, scenes of the 360 video change as 360 content proceeds with time. The initial view or initial viewport which is initially viewed by a user can change for each scene of the 360 video. In this case, the initial view/initial viewpoint related metadata can indicate the initial view per scene. To this end, the initial view/initial viewpoint related metadata may further include a scene identifier for identifying a scene to which the initial view is applied. In addition, since FOV may change per scene of the 360 video, the initial view/initial viewpoint related metadata may further include FOV information per scene which indicates FOV corresponding to the relative scene.

The ROI related metadata may include information related to the aforementioned ROI. The ROI related metadata may include a 2d_roi_range_flag field and/or a 3d_roi_range_flag field. These two fields can indicate whether the ROI related metadata includes fields which represent ROI on the basis of a 2D image or fields which represent ROI on the basis of a 3D space. According to an embodiment, the ROI related metadata may further include additional information such as differentiate encoding information depending on ROI and differentiate transmission processing information depending on ROI.

When the ROI related metadata includes fields which represent ROI on the basis of a 2D image, the ROI related metadata may include a min_top_left_x field, a max_top_left_x field, a min_top_left_y field, a max_top_left_y field, a min_width field, a max_width field, a min_height field, a max_height field, a min_x field, a max_x field, a min_y field and/or a max_y field.

The min_top_left_x field, max_top_left_x field, min_top_left_y field, max_top_left_y field can represent minimum/maximum values of the coordinates of the left top end of the ROI. These fields can sequentially indicate a minimum x coordinate, a maximum x coordinate, a minimum y coordinate and a maximum y coordinate of the left top end.

The min_width field, max_width field, min_height field and max_height field can indicate minimum/maximum values of the width and height of the ROI. These fields can sequentially indicate a minimum value and a maximum value of the width and a minimum value and a maximum value of the height.

The min_x field, max_x field, min_y field and max_y field can indicate minimum and maximum values of coordinates in the ROI. These fields can sequentially indicate a minimum x coordinate, a maximum x coordinate, a minimum y coordinate and a maximum y coordinate of coordinates in the ROI. These fields can be omitted.

When ROI related metadata includes fields which indicate ROI on the basis of coordinates on a 3D rendering space, the ROI related metadata may include a min_yaw field, a max_yaw field, a min_pitch field, a max_pitch field, a min_roll field, a max_roll field, a min_field_of_view field and/or a max_field_of_view field.

The min_yaw field, max_yaw field, min_pitch field, max_pitch field, min_roll field and max_roll field can indicate a region occupied by ROI on a 3D space using minimum/maximum values of yaw, pitch and roll. These fields can sequentially indicate a minimum value of yaw-axis based reference rotation amount, a maximum value of yaw-axis based reference rotation amount, a minimum value of pitch-axis based reference rotation amount, a maximum value of pitch-axis based reference rotation amount, a minimum value of roll-axis based reference rotation amount, and a maximum value of roll-axis based reference rotation amount.

The min_field_of_view field and max_field_of_view field can indicate minimum/maximum values of FOV of the corresponding 360 video data. FOV can refer to the range of view displayed at once when 360 video is reproduced. The min_field_of_view field and max_field_of_view field can indicate minimum and maximum values of FOV. These fields can be omitted. These fields may be included in FOV related metadata which will be described below.

The FOV related metadata may include the aforementioned FOV related information. The FOV related metadata may include a content_fov_flag field and/or a content_fov field. According to an embodiment, the FOV related metadata may further include additional information such as the aforementioned minimum/maximum value related information of FOV.

The content_fov_flag field can indicate whether corresponding 360 video includes information about FOV intended when the 360 video is produced. When this field value is 1, a content_fov field can be present.

The content_fov field can indicate information about FOV intended when the 360 video is produced. According to an embodiment, a region displayed to a user at once in the 360 video can be determined according to vertical or horizontal FOV of the 360 video reception apparatus. Alternatively, a region displayed to a user at once in the 360 video may be determined by reflecting FOV information of this field according to an embodiment.

Cropped region related metadata may include information about a region including 360 video data in an image frame. The image frame may include a 360 video data projected active video area and other areas. Here, the active video area can be called a cropped region or a default display region. The active video area is viewed as 360 video on an actual VR display and the 360 video reception apparatus or the VR display can process/display only the active video area. For example, when the aspect ratio of the image frame is 4:3, only an area of the image frame other than an upper part and a lower part of the image frame can include 360 video data. This area can be called the active video area.

The cropped region related metadata can include an is_cropped_region field, a cr_region_left_top_x field, a cr_region_left_top_y field, a cr_region_width field and/or a cr_region_height field. According to an embodiment, the cropped region related metadata may further include additional information.

The is_cropped_region field may be a flag which indicates whether the entire area of an image frame is used by the 360 video reception apparatus or the VR display. That is, this field can indicate whether the entire image frame indicates an active video area. When only part of the image frame is an active video area, the following four fields may be added.

A cr_region_left_top_x field, a cr_region_left_top_y field, a cr_region_width field and a cr_region_height field can indicate an active video area in an image frame. These fields can indicate the x coordinate of the left top, the y coordinate of the left top, the width and the height of the active video area. The width and the height can be represented in units of pixel.

Figure 9:
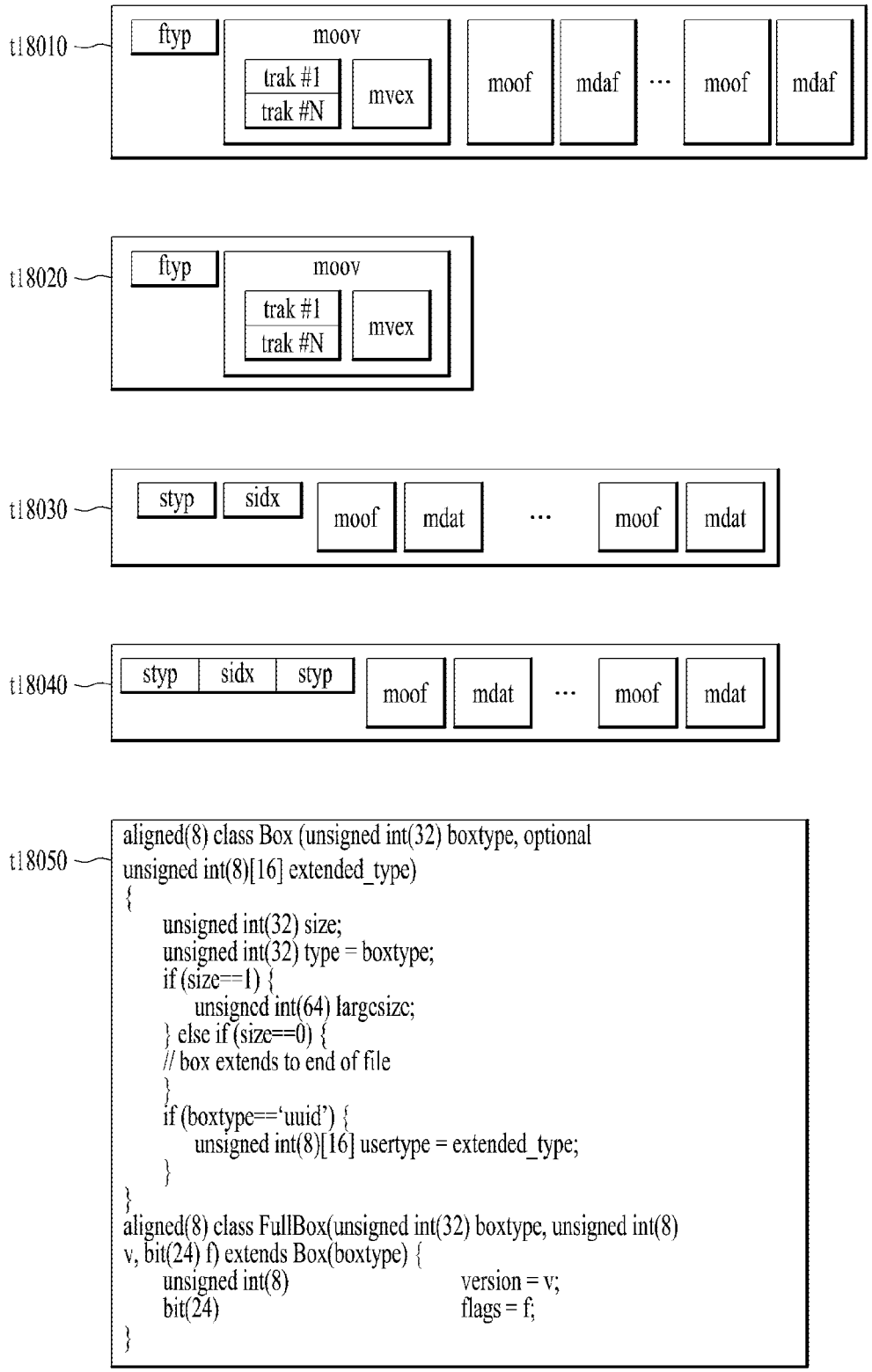
FIG. 9 illustrates a media file structure according to one embodiment of the present invention.

FIG. 9 illustrates a media file structure according to one embodiment of the present invention.

Figure 10:
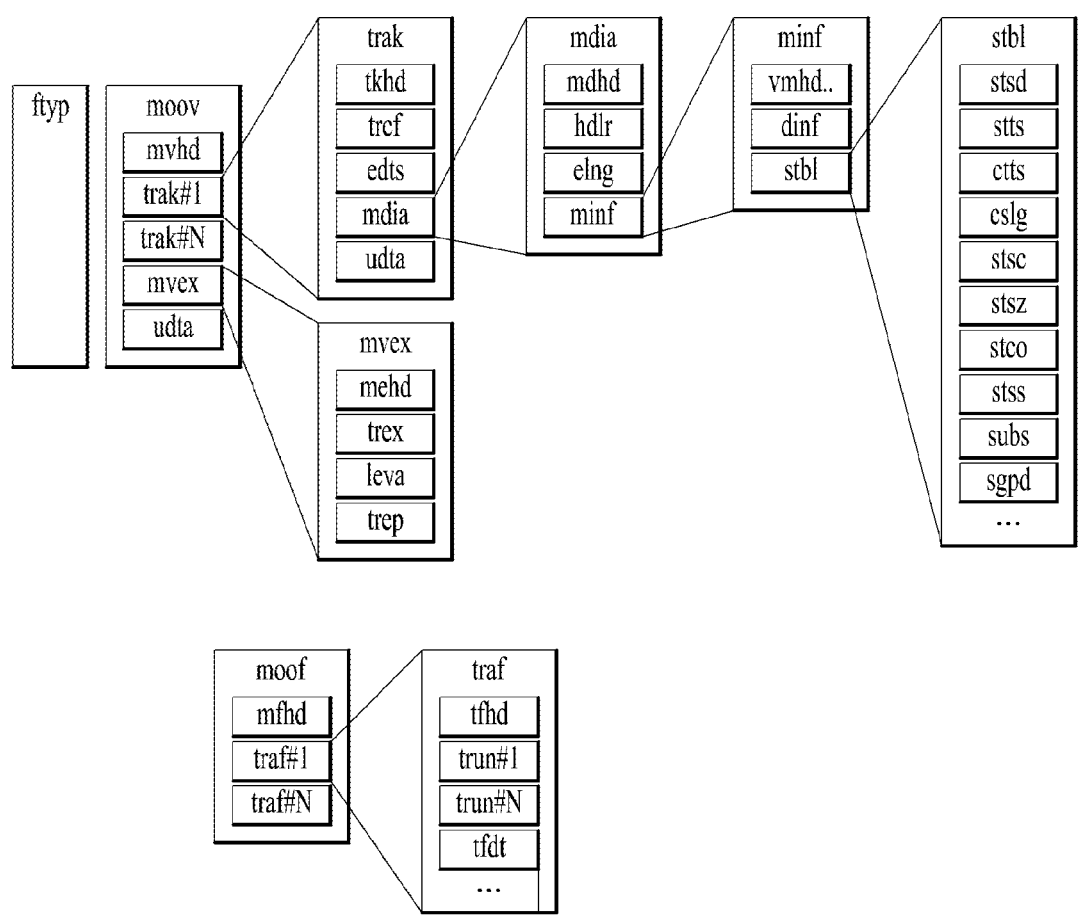
FIG. 10 illustrates a hierarchical structure of boxes in ISOBMFF according to one embodiment of the present invention.

FIG. 10 illustrates a hierarchical structure of boxes in ISOBMFF according to one embodiment of the present invention.

To store and transmit media data such as audio or video, a standardized media file format can be defined. According to an embodiment, a media file may have a file format based on ISO base media file format (ISOBMFF).

A media file according to the present invention may include at least one box. Here, a box may be a data block or an object including media data or metadata related to media data. Boxes may be arranged in a hierarchical structure, and thus data can be classified and a media file can take a form suitable for storage and/or transmission of media data. In addition, the media file may have a structure which facilitates accessing media information such as user moving to a specific point in media content.

The media file according to the present invention can include an ftyp box, a moov box and/or an mdat box.

The ftyp box (file type box) can provide information related to file type or compatibility of the corresponding media file. The ftyp box can include configuration version information about media data of the media file. A decoder can identify the corresponding media file with reference to the ftyp box.

The moov box (movie box) may include metadata about the media data of the media file. The moov box can serve as a container for all pieces of metadata. The moov box may be a box at the highest level among metadata related boxes. According to an embodiment, only one moov box may be included in the media file.

The mdat box (media data box) may contain actual media data of the corresponding media file. The media data can include audio samples and/or video samples and the mdat box can serve as a container for containing such media samples.

According to an embodiment, the moov box may include an mvhd box, a trak box and/or an mvex box as lower boxes.

The mvhd box (movie header box) can include media presentation related information of media data included in the corresponding media file. That is, the mvhd box can include information such as a media generation time, change time, time standard and period of corresponding media presentation.

The trak box (track box) can provide information related to a track of corresponding media data. The trak box can include information such as stream related information about an audio track or a video track, presentation related information, and access related information. A plurality of trak boxes may be provided depending on the number of tracks.

The trak box may include a tkhd box (track header box) as a lower box according to an embodiment. The tkhd box can include information about a track indicated by the trak box. The tkhd box can include information such as a generation time, change time and track identifier of the corresponding track.

The mvex box (movie extend box) can indicate that the corresponding media file may include a moof box which will be described below. Moov boxes may need to be scanned to recognize all media samples of a specific track.

The media file according to the present invention may be divided into a plurality of fragments according to an embodiment (t18010). Accordingly, the media file can be segmented and stored or transmitted. Media data (mdat box) of the media file is divided into a plurality of fragments and each fragment can include the moof box and divided mdat boxes. According to an embodiment, information of the ftyp box and/or the moov box may be necessary to use fragments.

The moof box (movie fragment box) can provide metadata about media data of a corresponding fragment. The moof box may be a box at the highest layer among boxes related to the metadata of the corresponding fragment.

The mdat box (media data box) can include actual media data as described above. The mdat box can include media samples of media data corresponding to each fragment.

According to an embodiment, the aforementioned moof box can include an mfhd box and/or a traf box as sub-boxes.

The mfhd box (movie fragment header box) can include information related to correlation of divided fragments. The mfhd box can include a sequence number to indicate the order of the media data of the corresponding fragment. In addition, it is possible to check whether there is omitted data among divided data using the mfhd box.

The traf box (track fragment box) can include information about a corresponding track fragment. The traf box can provide metadata about a divided track fragment included in the corresponding fragment. The traf box can provide metadata for decoding/reproducing media samples in the corresponding track fragment. A plurality of traf boxes may be provided depending on the number of track fragments.

According to an embodiment, the aforementioned traf box may include a tfhd box and/or a trun box as lower boxes.

The tfhd box (track fragment header box) can include header information of the corresponding track fragment. The tfhd box can provide information such as a basic sample size, period, offset and identifier for media samples of the track fragment indicated by the aforementioned traf box.

The trun box (track fragment run box) can include information related to the corresponding track fragment. The trun box can include information such as a period, size and reproduction timing of each media sample.

The aforementioned media file and fragments of the media file can be processed into segments and transmitted. Segments may include an initialization segment and/or a media segment.

A file of an embodiment t18020 shown in the figure may be a file including information related to initialization of a media decoder except media data. This file can correspond to the aforementioned initialization segment. The initialization segment can include the aforementioned ftyp box and/or the moov box.

The file of an embodiment t18030 shown in the figure may be a file including the aforementioned fragments. For example, this file can correspond to the aforementioned media segment. The media segment can include the aforementioned moof box and/or mdat box. In addition, the media segment can further include an styp box and/or an sidx box.

The styp box (segment type box) can provide information for identifying media data of a divided fragment. The styp box can perform the same role as the aforementioned ftyp box for a divided fragment. According to an embodiment, the styp box can have the same format as the ftyp box.

The sidx box (segment index box) can provide information indicating an index for a divided fragment. Accordingly, the sidx box can indicate the order of the divided fragment.

An ssix box may be further provided according to an embodiment t18040. The ssix box (sub-segment index box) can provide information indicating indexes of sub-segments when a segment is divided into the sub-segments.

Boxes in a media file may further include extended information on the basis of a box as shown in an embodiment t18050 or a full box. In this embodiment, a size field and a largesize field can indicate the length of a corresponding box in bytes. A version field can indicate the version of a corresponding box format. A type field can indicate the type or identifier of the corresponding box. A flags field can indicate flags related to the corresponding box.

FIG. 11 illustrates overall operation of a DASH based adaptive streaming model according to an embodiment of the present invention.

A DASH based adaptive streaming model according to an embodiment t50010 shown in the figure describes operations between an HTTP server and a DASH client. Here, DASH (dynamic adaptive streaming over HTTP) is a protocol for supporting HTTP based adaptive streaming and can dynamically support streaming depending on network state. Accordingly, reproduction of AV content can be seamlessly provided.

First, the DASH client can acquire an MPD. The MPD can be delivered from a service provider such as the HTTP server. The DASH client can request segments described in the MPD from the server using information for accessing the segments. The request can be performed based on a network state.

The DASH client can acquire the segments, process the segments in a media engine and display the processed segments on a screen. The DASH client can request and acquire necessary segments by reflecting a presentation time and/or a network state in real time (adaptive streaming). Accordingly, content can be seamlessly presented.

The MPD (media presentation description) is a file including detaned information used for the DASH client to dynamically acquire segments and can be represented in XML.

A DASH client controller can generate a command for requesting the MPD and/or segments on the basis of a network state. In addition, the DASH client controller can control an internal block such as the media engine to use acquired information.

An MPD parser can parse the acquired MPD in real time. Accordingly, the DASH client controller can generate a command for acquiring necessary segments.

A segment parser can parse acquired segments in real time. Internal blocks such as the media engine can perform a specific operation according to information included in the segment.

An HTTP client can request a necessary MPD and/or segments from the HTTP server. In addition, the HTTP client can deliver the MPD and/or segments acquired from the server to the MPD parser or the segment parser.

The media engine can display content on the screen using media data included in segments. Here, information of the MPD can be used.

A DASH data model may have a hierarchical structure t50020. Media presentation can be described by the MPD. The MPD can describe a time sequence of a plurality of periods which forms media presentation. A period indicates one section of media content.

In one period, data can be included in adaptation sets. An adaptation set may be a set of media content components which can be exchanged. Adaption can include a set of representations. A representation can correspond to a media content component. In one representation, content can be temporally divided into a plurality of segments for appropriate accessibility and delivery. To access each segment, the URL of each segment may be provided.

The MPD can provide information related to media presentation and a period element, an adaptation set element and a representation element can describe a corresponding period, adaptation set and representation. A representation can be divided into sub-representations, and a sub-representation element can describe a corresponding sub-representation.

Here, common attribute/elements can be defined. The common attributes/elements can be applied to (included in) sub-representations. The common attributes/elements may include EssentialProperty and/or SupplementalProperty.

The essential property may be information including elements regarded as mandatory elements in processing of corresponding media presentation related data. The supplemental property may be information including elements which may be used to process corresponding media presentation related data. In an embodiment, descriptors which will be described below may be defined in the essential property and/or the supplemental property and delivered through an MPD.

Figure 12:
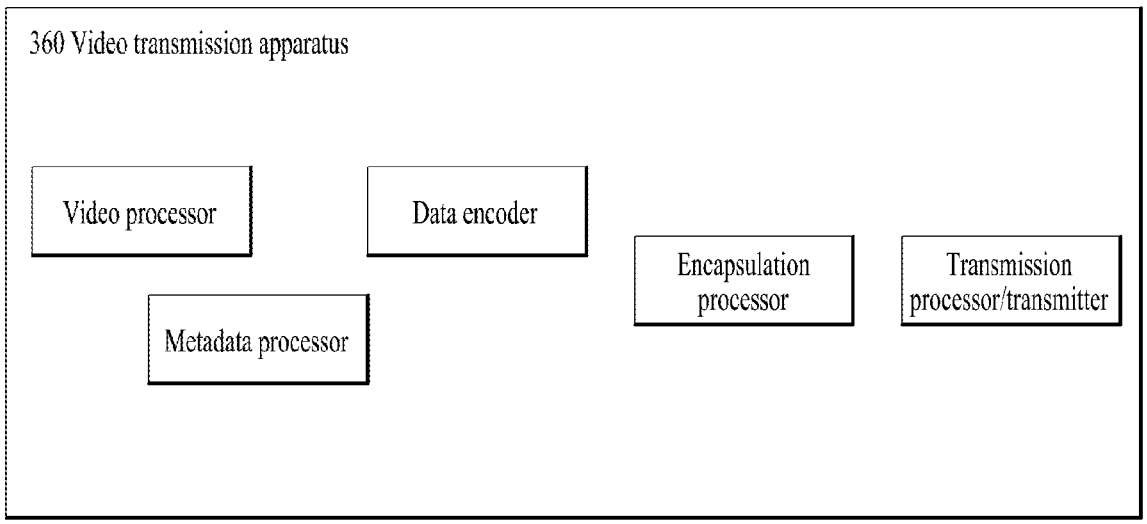
FIG. 12 illustrates a 360 video transmission apparatus according to one aspect of the present invention.

FIG. 12 illustrates a 360 video transmission apparatus according to one aspect of the present invention.

In one aspect, the present invention may relate to a 360 video transmission apparatus. The 360 video transmission apparatus may process 360 video data, generate signaling information about the 360 video data, and transmit the signaling information to the reception side.

Specifically, the 360 video transmission apparatus may map circular images acquired by a fisheye lens to a picture, encode the picture, generate signaling information about 360 video data, and transmit the 360 video data and/or signaling information in various forms and in various ways.

The 360 video transmission apparatus according to the present invention may include a video processor, a data encoder, a metadata processor, an encapsulation processor, and/or a transmission unit as internal/external components.

The video processor may process one or more circular images captured by a camera having at least one fisheye lens. Here, the circular images may include 360 video data. The video processor may map the circular images to a picture. According to an embodiment, the video processor may map the circular images to rectangular regions of the picture. Here, the picture may have a fisheye video format. In an embodiment, this mapping operation may be referred to as "packing" of the circular images. When the fisheye-based 360 video data acquired by the fisheye lens is used, the video processor may be a component that replaces the stitcher, the projection processor and/or the region-wise packing processor described above. In this case, the circular images acquired by the fisheye lens may be directly mapped to the picture without any other processing.

The data encoder may encode the picture to which the circular images are mapped. The data encoder may correspond to the data encoder described above.

The metadata processor may generate signaling information about the 360 video data. The metadata processor may correspond to the metadata processor described above.

The encapsulation processor may encapsulate the encoded picture and the signaling information into a file. The encapsulation processor may correspond to the encapsulation processor described above.

The transmission unit may transmit the 360 video data and the signaling information. When the information is encapsulated into a file, the transmission unit may transmit the files. The transmission unit may be a component corresponding to the transmission processor and/or the transmission unit described above. The transmission unit may transmit the information over a broadcast network or a broadband.

In one embodiment of the 360 video transmission apparatus according to the present invention, the above-described signaling information may include fisheye video information for processing the circular images at the receiver. The fisheye video information, which is a part of the signaling information, may provide circular images, rectangular regions to which the circular images are mapped, 360 monoscopic video data or 360 stereoscopic video data transmitted in the form of a circular image, information about the type of the rectangular regions. In addition, the fisheye video information may provide information necessary for extraction, projection, and blending of the circular images on the reception side. Details will be described later.

In another embodiment of the 360 video transmission apparatus according to the present invention, for each circular image, the aforementioned fisheye video information may include information for describing the corresponding circular image. For each rectangular region, the fisheye video information may also include information for describing the corresponding rectangular region. The information for describing the circular image and/or the information for describing the rectangular region may be used for the receiver to acquire fisheye 360 video data delivered over the circular images. According to an embodiment, such information may be used to extract 360 (fisheye) video data of a region corresponding to an intersection of a region corresponding to the circular image and the rectangular region.

In another embodiment of the 360 video transmission apparatus according to the present invention, the information for describing the circular image described above may include information indicating an attribute of the circular image. According to an embodiment, the information for describing the circular image may include information indicating an angle of view of the fisheye lens that has captured the circular image. Here, the angle of view of the fisheye lens may be represented by a Field Of View (FOV) of the fisheye lens, which may be different from the FOV of the above-described receiver VR display. As described above, the FOV of the VR display may refer to a viewing range in which a 360 video is displayed at a time when the video is reproduced. According to an embodiment, the information for describing the circular image may include information indicating the coordinates of the center point of a region occupied by the circular image in the 3D space. Here, the coordinates of the center point may be represented by the values of yaw, pitch and/or roll.

In another embodiment of the 360 video transmission apparatus according to the present invention, the above-described information for describing rectangular regions may include information for specifying a rectangular region and/or information for specifying a circular image mapped to the rectangular region. The information for specifying the rectangle may indicate the position of the upper leftmost point, width, and/or height of the rectangular region to specify the rectangular region. The information for specifying the circular image mapped to the rectangular region may indicate the coordinates of the center point and/or the radius of the circular image to specify the circular image.

In another embodiment of the 360 video transmission apparatus according to the present invention, the information for describing the rectangle described above may include region type information and/or additional region information. According to an embodiment, the additional region information may have a different meaning depending on the value of the region type information.

In another embodiment of the 360 video transmission apparatus according to the present invention, the region type information and/or the additional region information may have different meanings depending on whether the circular images include 360 monoscopic video data or 360 stereoscopic video data. According to an embodiment, the region type information and/or the additional region information may indicate information on whether the circular images are frame-packed in the corresponding region, what the viewing direction and/or the viewing position of the circular image is, and the like. Here, when two or more circular images are mapped to one region, it may be said that the images are frame packed. When only one circular image is mapped to one region, it may be said that the image is not frame-packed.

In another embodiment of the 360 video transmission apparatus according to the present invention, the 360 monoscopic video data may refer to 360 video data provided in 2 dimensions (2D). The 360 stereoscopic video data may refer to 360 video data that may be provided in 3D. The 360 stereoscopic video data may be provided in 2D, according to the capability of the receiver.

In another embodiment of the 360 video transmission apparatus according to the present invention, the viewing direction of a circular image may mean the direction of a region in which the circular image is positioned in the 3D space. For example, when the circular image corresponds to the front in the 3D space of a sphere or the like, the viewing direction of the circular image may be "front."

In another embodiment of the 360 video transmission apparatus according to the present invention, the viewing position of a circular image may mean whether the circular image corresponds to a left image or a right image in delivering the 360 stereoscopic video data. For example, when the circular image has an image corresponding to the left image of the 360 stereoscopic video, the viewing position of the circular image may be "left."

In another embodiment of the 360 video transmission apparatus according to the present invention, the video processor may map one circular image to one rectangular region. According to an embodiment, the video processor may map a plurality of circular images to one rectangular region. According to an embodiment, the video processor may map N circular images to M rectangular regions.

In another embodiment of the 360 video transmission apparatus according to the present invention, when the circular images deliver 360 stereoscopic video data, the above-mentioned region type information may indicate the viewing position of a single circular image mapped to a rectangular region. In this case, the above-mentioned additional region information may indicate a viewing direction of the single circular image.

In another embodiment of the 360 video transmission apparatus according to the present invention, when the circular images deliver 360 stereoscopic video data, the above-described region type information may indicate whether a plurality of circular images having the same viewing direction is mapped to the rectangular region. That is, the region type information may indicate whether the circular images frame-packed in the rectangular region are grouped based on the same viewing direction. In this case, the above-mentioned additional region information may indicate what the same viewing direction is.

In another embodiment of the 360 video transmission apparatus according to the present invention, when the circular images deliver 360 stereoscopic video data, the region type information may indicate whether a plurality of circular images having the same viewing position is mapped to the rectangular region. That is, the region type information may indicate whether the circular images frame-packed in the rectangular region are grouped based on the same viewing position. In this case, the above-mentioned additional region information may indicate what the same viewing position is.

In another embodiment of the 360 video transmission apparatus according to the present invention, the video processor may not perform stitching or region-wise packing of the circular images in processing the circular images as described above. That is, the video processor may omit the stitching and region-wise packing operation in processing the fisheye lens-based 360 fisheye video data.

In another embodiment of the 360 video transmission apparatus according to the present invention, the signaling information or fisheye video information about the 360 video data may be generated in the form of a Dynamic Adaptive Streaming over HTTP (DASH) descriptor. The fisheye video information may include a DASH descriptor in another format. In this case, the DASH descriptor may be included in the Media Presentation Description (MPS) and be transmitted through a separate path different from that for the 360 fisheye video data file. In this case, the fisheye video information may not be encapsulated into the file, unlike the 360 video data. That is, the fisheye video information may be delivered to the reception side in the form of MPD or the like on a separate signaling channel. According to an embodiment, the fisheye video information may be simultaneously included in the file and separate signaling information such as MPD.

In another embodiment of the 360 video transmission apparatus according to the present invention, the signaling information or fisheye video information about the 360 video data may be embedded in a file in the form of an ISO Base Media File Format (ISOBMFF) box. According to an embodiment, the file may be an ISOBMFF file or a file conforming to the Common File Format (CFF). In this case, the fisheye video information may be positioned at a level such as a sample entry.

In another embodiment of the 360 video transmission apparatus according to the present invention, the signaling information or fisheye video information about the 360 video data may be delivered at the video level in the form of a Supplemental enhancement information (SEI) message.

In another embodiment of the 360 video transmission apparatus according to the present invention, the circular images may be images for a 360 video captured by the fisheye lens, and be referred to as fisheye images or the like.

In another embodiment of the 360 video transmission apparatus according to the present invention, the 360 video transmission apparatus may further include a (transmission side) feedback processor. The (transmission side) feedback processor may correspond to the (transmission side) feedback processor described above. The (transmission side) feedback processor may receive feedback information indicating the viewport of a current user from the reception side. This feedback information may include information for specifying a viewport that the current user is viewing through a VR device or the like. As described above, tiling or the like may be performed using the feedback information. In this case, one region of a subpicture or a picture transmitted by the 360 video transmission apparatus may be one region of the subpicture or picture corresponding to the viewport indicated by the feedback information. In this case, the fisheye video information may provide 360 fisheye video data related information about one region of the subpicture and the picture corresponding to the viewport indicated by the feedback information.

In another embodiment of the 360 video transmission apparatus according to the present invention, the fisheye video information may provide related signaling information based on the case where the 360 fisheye video data carries the entire image. According to an embodiment, when a subpicture of the entire image is transmitted, the fisheye video information may further include information on whether a fisheye lens-based image is included in the subpicture and information on a part corresponding to the image included in the subpicture. Here, the subpicture may correspond to a tile in the tiling operation described above.

In another embodiment of the 360 video transmission apparatus according to the present invention, the fisheye video information may be applied not only to a case of delivering an image acquired from the fisheye lens-based camera but also to a case of delivering an image acquired from a typical lens-based camera. That is, not only in the case of transmitting a fisheye lens-based image to the receiver, but also in the case where a typical lens-based image is transmitted to the receiver such that the receiver provides a 360 video, a panoramic video, or a typical video service, the fisheye video information according to embodiments of the present invention may be utilized. For example, six typical-lens-based cameras may be configured to match the respective faces of a cubemap. Even in this case, the fisheye video information proposed by the present invention may deliver a stereoscopic or monoscopic camera configuration for a corresponding image, information for extraction of individual images, information for rendering, and the like.

In another embodiment of the 360 video transmission apparatus according to the present invention, the 3D space may be a sphere. According to an embodiment, the 3D space may be a cube or the like.

In another embodiment of the 360 video transmission apparatus according to the present invention, the 360 video transmission apparatus may further include a data input unit or the like, which is not shown. The data input unit may correspond to the above-described internal component having the same name.

The embodiments of the 360 video transmission apparatus according to the present invention described above may be combined with each other. In addition, the internal/external components of the 360 video transmission apparatus according to the present invention may be added, changed, replaced or omitted according to the embodiments. In addition, the internal/external components of the 360 video transmission apparatus described above may be implemented as hardware components.

Figure 13:
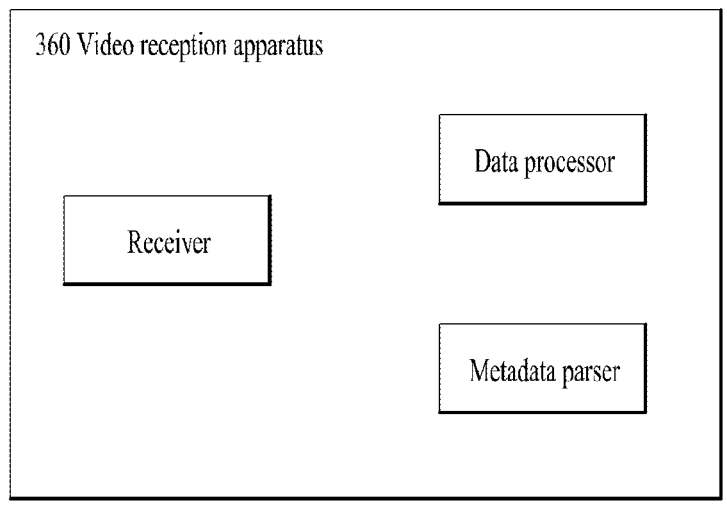
FIG. 13 illustrates a 360 video reception apparatus according to another aspect of the present invention.

FIG. 13 illustrates a 360 video reception apparatus according to another aspect of the present invention.

According to another aspect, the present invention may relate to a 360 video reception apparatus. The 360 video reception apparatus may receive 360 video data and/or signaling information about the 360 video data and process the same to render a 360 video for the user. The 360 video receiving apparatus may be a reception side apparatus corresponding to the above-described 360 video transmission apparatus.

Specifically, the 360 video reception apparatus may receive fisheye-based 360 video data and/or signaling information about the fisheye-based 360 video data, acquire the signaling information, decode the fisheye-based 360 video data based on the received signaling information, extract circular images from the picture of the fisheye-based 360 video data and the rectangular regions of the picture, project the extracted circular images on a plane, blend the projected circular images into one picture, and render a fisheye-based 360 video based on the blended picture.

The 360 video reception apparatus according to the present invention may include a reception unit, a data processor, and/or a metadata parser as internal/external components.

The reception unit may receive 360 (fisheye) video data and/or signaling information about the 360 video data. According to an embodiment, the reception unit may receive such information in the form of a file. According to an embodiment, the reception unit may receive the information over a broadcast network or a broadband. The reception unit may be a component corresponding to the above-described reception unit.

The data processor may acquire 360 (fisheye) video data and/or signaling information about the 360 video data from the received file or the like. The data processor may process the received information according to the transmission protocol, decapsulate the file, or decode the 360 video data. Here, the data processor that processes the 360 fisheye video data may extract circular images from a picture having the 360 fisheye video data. In the extraction process, the circular images may be extracted from the rectangular regions of the picture. The data processor may project the extracted circular images onto respective planes. Further, the data processor may synthesize the plurality of planes onto which the circular images are projected into one plane. This synthesis operation may be referred to as blending. According to an embodiment, the projection operation and the blending operation may be collectively referred to as stitching. According to an embodiment, the blending operation may be referred to as a border region fusion operation. For reference, this stitching operation may be different from the stitching operation performed on the transmission side. The data processor may then perform rendering based on the blended plane to create a viewport. The video processor may utilize the signaling information acquired from the metadata parser in performing these operations. The data processor may be a component that performs functions corresponding to the reception processor, decapsulation processor, data decoder, and/or renderer described above.

The metadata parser may parse the acquired signaling information. The metadata parser may correspond to the above-described metadata parser.

The 360 video reception apparatus according to the present invention may have embodiments corresponding to the 360 video transmission apparatus according to the present invention described above. The 360 video reception apparatus and the internal/external components thereof according to the present invention may implement embodiments corresponding to the above-described embodiments of the 360 video transmission apparatus according to the present invention.

The above-described embodiments of the 360 video reception apparatus according to the present invention may be combined with each other. In addition, the internal/external components of the 360 video reception apparatus according to the present invention may be added, changed, replaced or omitted depending on embodiments. In addition, the internal/external components of the 360 video reception apparatus described above may be implemented as hardware components.

Figure 14:
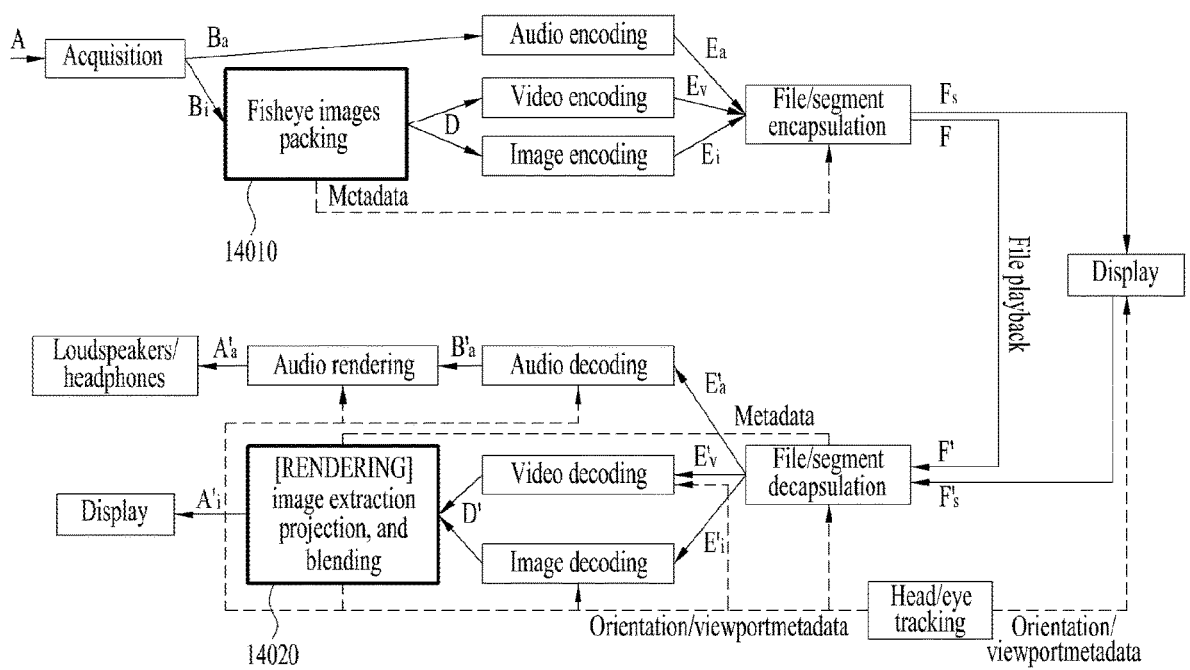
FIG. 14 illustrates an embodiment of a process of processing 360 fisheye video data according to the present invention.

FIG. 14 illustrates an embodiment of a process of processing 360 fisheye video data according to the present invention.

As described above, the 360 video transmission apparatus and the 360 video reception apparatus may process the 360 fisheye video data.

In the illustrated embodiment of the process of processing 360 fisheye video data, the video processor of the 360 video transmission apparatus may map circular images having 360 fisheye video data to rectangular regions of a picture (14010).

The 360 video transmission apparatus may first acquire images captured by a 360 camera. Here, the 360 camera may refer to one or more fisheye cameras, or a camera having at least one fisheye lens and at least one sensor.

The video processor of the 360 video transmission apparatus may map/pack circular images onto a picture (14010). The video processor may then encode the picture as described above, and the metadata processor may generate the 360 fisheye video data and signaling information about the circular images and/or the rectangular regions. Thereafter, the 360 video data and/or the signaling information may be transmitted to the reception side through operations such as file encapsulation as described above.

As shown in the figure, the operations of the video processor, such as stitching, projection, and/or region-wise packing, may be replaced by the operation 14010 of packing the circular images.

In the illustrated embodiment of the 360 fisheye video data processing process, the data processor of the 360 video reception apparatus may extract 360 fisheye video data corresponding to the circular images from the rectangular regions of the picture, project the extracted data on planes, and blend the planes into one plane (14020).

The reception unit of the 360 video reception apparatus may acquire 360 video data and/or signaling information from the received broadcast signal or the like and process the same. The data processor and metadata parser of the 360 video reception apparatus may acquire 360 fisheye video data and/or signaling information from the received bitstream.

The data processor of the 360 video reception apparatus may extract circular images from a picture having the 360 fisheye video data (Extraction). The data processor may extract respective images for a single fisheye lens.

According to an embodiment, the data processor may extract rectangular regions first, and then extract a region to which the circular images are mapped in the rectangular regions. In this case, the region corresponding to the inner intersection of the rectangular region and the region to which circular image is mapped may be actual 360 fisheye video data acquired through the fisheye lens. The other invalid region may be marked in black or the like so as to be distinguished. According to an embodiment, the data processor may extract a region corresponding to the intersection of the rectangular region and the region to which circular image is mapped. Here, the region to which the circular image is mapped may be called a circular region.

The data processor may specify a rectangular region using the above-described fisheye video information. In this operation, information on the upper leftmost point, width, and/or height of the rectangular region provided by the fisheye video information may be used. Further, the data processor may specify a region to which the circular image is mapped using the above-described fisheye video information. In this operation, the information about the center point and/or the radius information provided by the fisheye video information may be used.

The data processor of the 360 video reception apparatus may project the extracted circular images onto a plane (Projection). Here, the plane may be an Equirectangular Projection (ERP) plane. This projection process may be an intermediate step for re-projecting the circular images onto a 3D space such as a spherical coordinate system.

The valid region actually having the above-described 360 fisheye video data may be defined as an intersection of the rectangular region and the region to which the circular images are mapped. Here, the data processor may perform ERP onto a valid region based on the fact that the valid region has a one-to-one relationship with a region that the valid region has in the 3D space. As described above, the region that the valid region has in the 3D space may be defined by the angle-of-view information and the information about the center point. The information about the center point may be expressed in the form of yaw, pitch, and roll or the form of azimuth, elevation, and tilt.

According to an embodiment, the data processor may project the image of the extracted valid region onto a plane using standardized projection according to the angle of view. According to an embodiment, if the axis of the lens differs among the circular images due to mechanical properties, or if lens correction is not properly performed in the ISP, the metadata processor on the transmission side may generate additional parameters and add the same to the signaling information. The additional parameters may be used by the data processor on the reception side to perform the projection. The additional parameters may include a lens distortion correction parameter and/or a lens shading correction parameter.

The data processor of the 360 video reception apparatus may blend at least one projected plane into one ERP plane (Blending). According to an embodiment, the circular images may overlap with each other due to the angle of view of the fisheye lens and the coordinates of the center point. The data processor may appropriately blend the pixel information about the overlapping portions.

The data processor of the 360 video reception apparatus may perform rendering based on the final blended ERP plane (picture) and generate a corresponding viewport.

As shown in the figure, the process of image rendering of the data processor may be replaced with the operation 14020 of extraction, projection, and blending described above.

Figure 15:
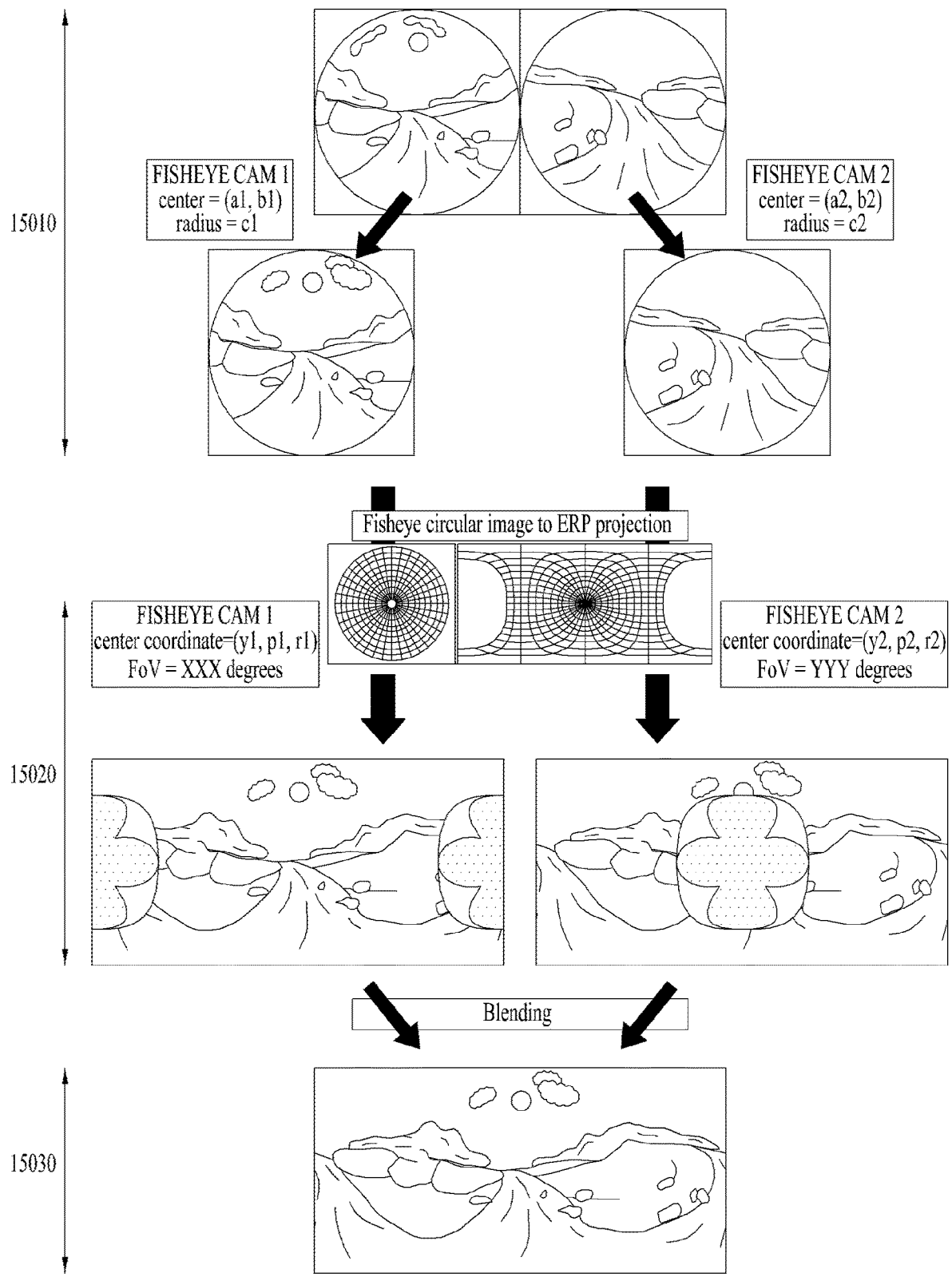
FIG. 15 illustrates another embodiment of the process of processing 360 fisheye video data according to the present invention.

FIG. 15 illustrates another embodiment of the process of processing 360 fisheye video data according to the present invention.

As described above, the data processor of the 360 video reception apparatus may extract 360 fisheye video data corresponding to the circular images from the rectangular regions of a picture, project the extracted data onto planes, and blend the planes into one plane.

In the illustrated embodiment of the 360 video data processing process, two circular images acquired by two fisheye lenses having an angle of view of 180 degrees or more may be delivered to the reception side.

In this embodiment, the data processor may extract a valid region corresponding to the 360 fisheye video data of the circular images from the picture (15010). A first valid region may be represented by the intersection of a first rectangular region and a first circular region. Here, the circular region may be a region specified by the center point (a1, b1) and the radius c1. A second valid region may be represented by the intersection of a second rectangular region and a second circular region. Here, the circular region may be a region specified by the center point (a2, b2) and the radius c2. According to an embodiment, the other portion that is not the valid region may be processed in black.

Thereafter, the data processor may project each extracted image onto each ERP plane (15020). A first image may have coordinates (y1, p1, r1) of the center in the 3D space and an angle of view of XXX degrees. A second image may have coordinates (y2, p2, r2) of the center in the 3D space and an angle of view of YYY degrees. As a result of the projection, two projected ERP planes may be output.

The data processor may blend the ERP planes into one ERP plane (15030). The data processor may generate a viewport based on one blended ERP plane (15040).

The above-described information about the specification of the rectangular region, the specification of the circular region, the angle of view, and the like may be acquired through the signaling information about the above-described 360 video data.

The above-described embodiments of the 360 fisheye video data processing process according to the present invention may be combined with each other. In the embodiments of the 360 video transmission apparatus and the 360 video data reception apparatus according to the present invention, the 360 fisheye video data processing process may be the 360 fisheye video data processing process according to the above-described embodiments.

Figure 16:
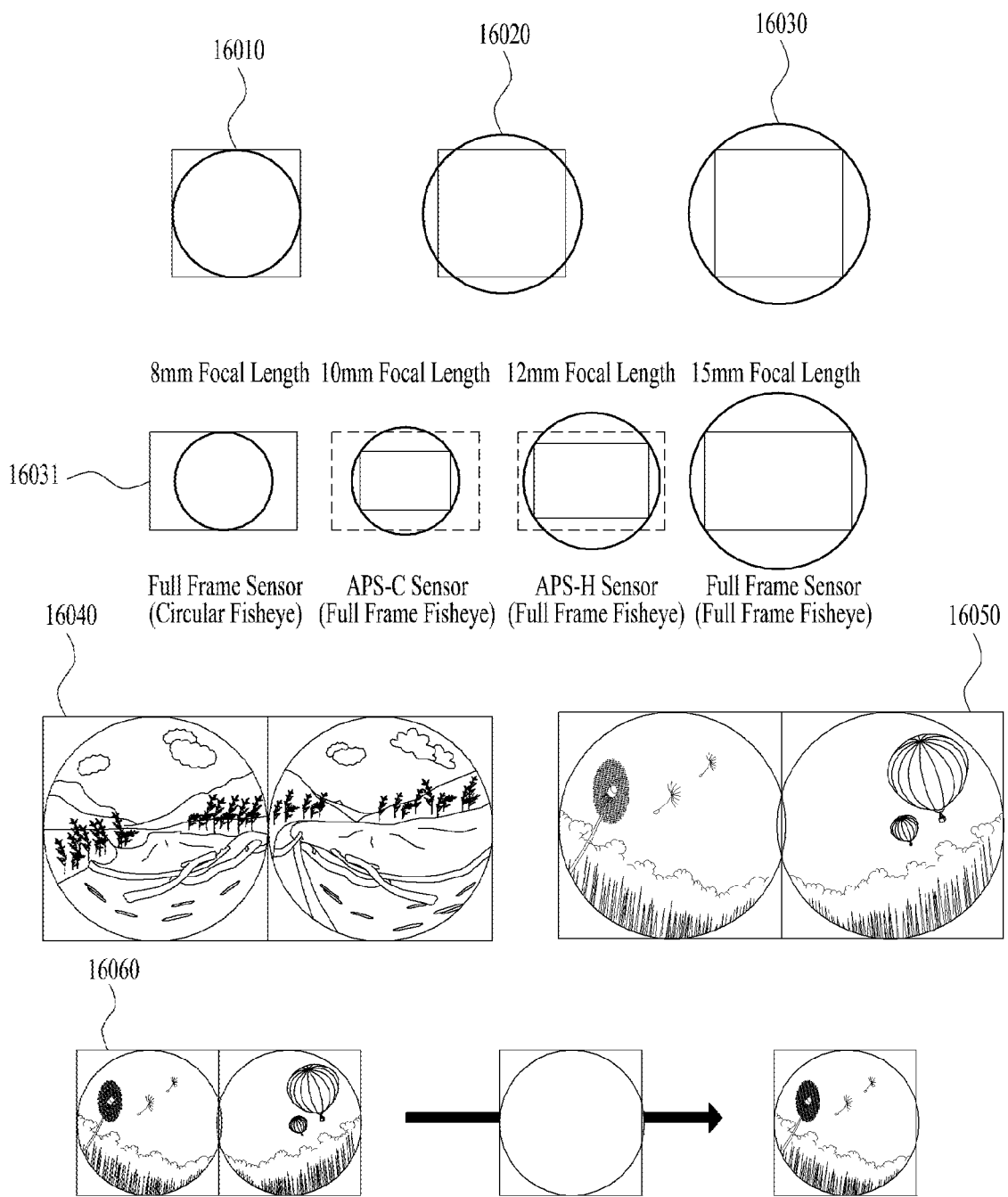
FIG. 16 illustrates an embodiment of a process of extracting 360 fisheye video data according to the present invention.

FIG. 16 illustrates an embodiment of a process of extracting 360 fisheye video data according to the present invention.

As described above, the data processor of the 360 video reception apparatus may extract 360 fisheye video data corresponding to the circular images from the rectangular regions of the picture.

The data processor may simultaneously utilize the circular regions and the rectangular regions of the picture in order to extract a valid region including the actual 360 fisheye video data from the picture. As described above, the circular region may refer to a region corresponding to a circular image.

In the extraction process of the data processor, the valid region may have various shapes depending on the distance between the fisheye lens and the imaging surface (on the sensor), the size of the sensor frame, the focal length, and the like.

When the size of the sensor frame is adequately large compared to the focal length, that is, when the circular image is within the rectangular region of the frame, the valid region may be the entire circular image (16010).

When the size of the sensor frame is small compared to the focal length, that is, when a part of the circular image is outside the frame, the valid region may be the circular image with an outer edge portion thereof truncated (16020).

When the size of the sensor frame is excessively small compared to the focal length, and thus the diagonal length of the frame is shorter than the diameter of the circular image, the valid region may have a rectangular shape, and a part of the circular image may occupy the entire frame (16030).

In the illustrated embodiment 16031, a circular valid region may be acquired using a full-frame sensor with a focal length of 8 mm (Circular Fisheye) (the first view from the left). A rectangular valid region occupying the entire frame may be acquired using the APS-C sensor with a focal length of 10 mm (Full Frame Fisheye) (the second view from the left). Using an APS-H sensor with a focal length of 12 mm, a rectangular valid region occupying the entire frame may be acquired (Full Frame Fisheye) (the third view from the left). Using a full frame sensor with a focal length of 15 mm, a rectangular valid region occupying the entire frame may be acquired (Full Frame Fisheye) (the fourth view from the left).

According to an embodiment, in the extraction operation of the data processor, a plurality of circular images may be separated on the picture (16040), but they may be overlapped and packed (16050).

In the case where multiple circular images are packed in a separated manner (16040), the valid regions are two whole circles, and accordingly the valid regions may be accurately extracted using only information about the circular regions. However, in the case where multiple circular images are packed in an overlapping manner (16050), when extraction is performed based only on the information about the circular region, a portion of an adjacent image may be extracted as well.

In order to prevent a portion of other images from being extracted, the data processor may extract only the region corresponding to the intersection of the circular region and the rectangular region as described above. Alternatively, according to an embodiment, the data processor may extract a final valid region by extracting a rectangular region first and then extracting a circular region from the rectangular region (16060).

The above-described embodiments of the 360 fisheye video data extraction process according to the present invention may be combined with each other. In the embodiments of the 360 video data reception apparatus according to the present invention, the operation of extracting 360 fisheye video data may be the 360 fisheye video data extraction operation according to the above-described embodiments.

FIG. 17 illustrates an embodiment of fisheye video information according to the present invention.

As described above, the fisheye video information according to the present invention may include information about 360 fisheye video data as a kind of signaling information about the 360 video data. As described above, the fisheye video information may provide information necessary for the operation of extraction, projection, and blending at the receiver.

According to an embodiment, the fisheye video information may be transmitted in the form of metadata of a video codec, may be delivered over an SEI message of a video codec such as HEVC or delivered in the form of VPS, SPS, PPS, or the like. According to an embodiment, the fisheye video information may be delivered through a digital wired/wireless interface, a system-level file format, or the like.

In the illustrated embodiment, the fisheye video information may be presented by being included in an SEI message (17010). The illustrated SEI message may include omnidirectional_fisheye_video corresponding to the fisheye video information.

The omnidirectional_fisheye_video 17020 may include omnidirectional_fisheye_video_id, stereoscopic_flag, synchronized_left_right_360camera_flag, num_viewing_directions_minus1 and/or num_picture_regions_minus1 fields.

The omnidirectional_fisheye_video_id field may represent an identifier for identifying the corresponding fisheye video information. When a plurality of fisheye video informations is used in a single 360 fisheye video data, each fisheye video information may be identified by this field. For example, in the case of a 360 video including a plurality of pictures, the respective pictures may be distinguished by this field. According to an embodiment, this field may be assigned a value differently depending on use of the frame packing arrangement, the frame packing arrangement scheme, or the like.

The stereoscopic_flag field may indicate whether 360 stereoscopic video data is included in the corresponding (decoded) picture. When the value of this field is 1, it may be indicated that video data corresponding to a left image or right image for supporting stereoscopic video is included in the picture.

When 360 stereoscopic video data is used, the synchronized_left_right_360camera_flag field may indicate whether the number of cameras for the left image is equal to the number of cameras for the right image. That is, this field may indicate whether the number of circular images for the left image is equal to the number of circular images for the right image. Alternatively, this field may indicate whether the number of viewing directions for the left image is equal to the number of viewing directions for the right image.

When the value of this field is 1, the number of left cameras and the number of right cameras for the 360 stereoscopic video may be equal to each other, or the number of right lenses may be equal to the number of left lenses. Accordingly, the num_viewing_directions_minus1 field, which will be described later, may indicate the same number of cameras or viewing directions for the left and right images. In addition, when the value of this field is 1, the left and right cameras or lenses may have the same characteristics and be set to photograph the same position. That is, respective circular images from the left and right cameras may have the same yaw, pitch, and roll values. Accordingly, the field_of_view [i], center_yaw [i], center_pitch [i], and center_roll [i] fields, which will be described later, may indicate the characteristics of the left and right cameras or the circular images.

When the value of this field is 0, the number of right cameras or lenses and the number of left cameras or lenses for 360 stereoscopic video may not be equal to each other. In addition, when the value of this field is 0, it may indicate that the left and right cameras or lenses have different characteristics. Accordingly, num_viewing_directions_minus1, field_of_view [i], center_yaw [i], center_pitch [i] and center_roll [i] fields, which will be described below, indicate the characteristics of the left camera or the left circular image. num_viewing_directions_per_right_view_minus1, field_of_view_per_right_view[i], center_yaw_per_right_view[i], center_pitch_per_right_view[i], and center_roll_per_right_view[i] fields may indicate the characteristics for the right camera or right circular image.

The num_viewing_directions_minus1 field may indicate the number of viewing directions defined in the corresponding picture. That is, this field may indicate the number of circular images captured by a fisheye lens with respect to a single viewing position (left/right). When 1 is added to the value of this field, the number of the above-described viewing directions may be obtained. For example, when circular images having two viewing directions of front and back for the left image are included in the corresponding picture, the value of this field may be 1. According to an embodiment, each viewing direction may be considered as a single camera.

The num_picture_regions_minus1 field may indicate the number of rectangular regions defined in the corresponding picture. By adding 1 to the value of this field, the number of the above-described rectangular regions may be obtained.

The fisheye video information according to the illustrated embodiment may further include a disparity field when the value of the stereoscopic_flag field is 1. The disparity field may represent the distance between the left and right cameras, i.e., a disparity value, for a 360 stereoscopic video. Using the value of this field, the 360 video reception apparatus may provide stereoscopic subtitles and stereoscopic graphic overlays that match the depth or images of the 360 stereoscopic video.

The fisheye video information according to the illustrated embodiment may further include field_of_view[i], center_yaw[i], center_pitch[i] and/or center_roll[i] fields for respective viewing directions or circular images having the corresponding viewing directions, depending on the value of the num_viewing_directions_minus1 field. The information of the for-loop according to the num_viewing_directions_minus1 field may correspond to the information about the circular images described above.

The field_of_view[i] field may indicate the angle of view of the fisheye lens that has captured the i-th circular image. This may be called an angle of view of the corresponding circular image depending on the context. The value of this field may be in units of degrees.

Even if circular images have the same size, the images may occupy different areas in the an ERP plane or the like onto which the images are projected, depending on the angle of view. For example, a circular image captured with a lens having an angle of view of 220 degrees may be projected in such a manner as the projection 15020 of the circular image onto the ERP plane described above. For example, a circular image captured with a lens having an angle of view of 180 degrees may cover a smaller region than in the projection 15020 as a result of the projection. That is, of the circular images having the same size, a circular image having a larger angle of view may be seen as having been more densely sampled.

The fisheye video information according to the illustrated embodiment may further include a view_idc[i] field (not shown) for each circular image. The view_idc field may indicate whether the 360 video of the corresponding circular image is 360 stereoscopic or monoscopic video and/or whether the video is for a left/right image. According to one embodiment of the view_idc[i] field, when the view_idc[i] field is 0, the 360 video of the corresponding circular image may be a 360 monoscopic video. When the field is 1, the 360 video of the corresponding region may be the left image of a 360 stereoscopic video. When the field is 2, the 360 video of the corresponding circular image may be the right image of the 360 stereoscopic video. When the field is 3, the 360 video of the corresponding circular image may be the left image and right image of the 360 stereoscopic video.

When the view_idc[i] field is 0 or 1, the field_of_view[i] field may indicate an angle of view in the viewing direction. When the view_idc[i] field is 2 or 3, the field_of_view[i] field may indicate an angle of view of a circle after up sampling of the left and right circular images on the assumption that the left/right circular images in the viewing direction have the same angle of view.

The center_yaw[i], center_pitch[i], center_roll[i] fields may indicate a position in the 3D space where a circular image in the i-th viewing direction is presented. That is, the fields may indicate the yaw, pitch, and roll values of the center point of a region occupied by the circular image in the 3D space.

When the view_idc[i] field is 0 or 1, the center_yaw[i], center_pitch[i], and center_roll[i] fields may indicate the yaw, pitch and roll of the center point of a circular image in the corresponding viewing direction, respectively. When the view_idc[i] field is 2 or 3, the yaw, pitch, and roll values may be indicated on the assumption that the center points of the left and right circular images in the corresponding viewing direction have the same yaw, pitch, and roll values.

In the present invention, i of the field_of_view [i], center_yaw [i], center_pitch [i], and center_roll [i] may be in the range of 0 to num_viewing_directions_minus1 and be used as an index to refer to a camera lens output image or fisheye lens output image (circular image) positioned at each yaw, pitch, and roll.

When the value of the stereoscopic_flag field is 1 and the value of the synchronized_left_right_360camera_flag field is 0, the fisheye video information according to the illustrated embodiment may further include num_viewing_directions_per_right_view_minus1, field_of_view_per_right_view[i], center_yaw_per_right_view[i], center_pitch_per_right_view[i], and/or center_roll_per_right_view[i] fields.

The num_viewing_directions_per_right_view_minus1, field_of_view_per_right_view[i], center_yaw_per_right_view[i], center_pitch_per_right_view[i], and center_roll_per_right_view[i] fields may be added when the number of cameras, configuration of the lens, the angle of view, the values of yaw, pitch and roll, and the like different between the left and right images of a provided 360 stereoscopic video.

In this case, the num_viewing_directions_minus1, field_of_view [i], center_yaw [i], center_pitch [i], and center_roll [i] fields described above may be used as information for the left image, and the num_viewing_directions_per_right_view_minus1, field_of_view_per_right_view[i], center_yaw_per_right_view[i], center_pitch_per_right_view[i], and center roll_per_right_view[i] fields may be used as information for the right image. The description of each of the added fields may be the same as the description of the num_viewing_directions_minus1, field_of_view [i], center_yaw [i], center_pitch [i], center_roll [i] fields described above.

The fisheye video information according to the illustrated embodiment may include region_type[i], region_info[i], rect_region_top[i], rect_region_left[i], rect_region_width[i], rect_region_height[i], circular_image_center_x[i], circular_image_center_y[i], and/or circular_image_radius[i] fields for each rectangular region according to the value of the num_picture_regions_minus1 field. The information according to the for-loop of the num_picture_regions_minus1 field may correspond to the information about the rectangular regions described above.

The region_type[i] and region_info[i] fields will be described later.

The rect_region_top[i], rect_region_left[i], rect_region_width[i], and rect_region_height[i] fields may indicate the upper left position (the position of the upper leftmost point), the width and the height of a rectangular region to which the i-th circular image captured by the fisheye lens is mapped.

When the view_idc[i] field is 0 or 1, each rectangular region may be defined to correspond to each circular image. That is, one circular image may be mapped to one rectangular region. When the view_idc[i] field is 2 or 3, two or more circular images (left and right images) may be mapped to one rectangular region.

The circular_image_center_x[i] and circular_image_center_y[i] fields may indicate the center point of the circle in the i-th circular image captured by the fisheye lens. According to an embodiment, the fields may indicate the center point of the circle using the position on the luma sample index in the picture, the position on the relative luma sample index in the corresponding rectangular region, a ratio at a unit length, or the like.

When the view_idc[i] field is 0 or 1, the circular_image_center_x[i] and circular_image_center_y[i] fields may define the center of each circle. When the view_idc[i] field is 2 or 3, the circular_image_center_x [i], circular_image_center_y [i] fields may define the center of the same circle on the assumption that the left and right circular images have the center of the same circle. Here, it may be assumed that the left and right circular images are mapped to the same rectangular region.

The circular_image_radius[i] field may indicate the radius of the i-th circular image captured by the fisheye lens. That is, this field may indicate a straight-line distance from the center of the circle image to the outermost edge thereof. According to an embodiment, the field may define the radius of the circle as the distance from the center point on the luma sample index to the center of the outermost pixel, the distance to the distal boundary of the outermost pixel, the distance to the center or distal boundary of the outermost pixel in the vertical or horizontal direction, the ratio at the unit length, or the like.

When the view_idc[i] field is 0 or 1, the circular_image_radius[i] field may define the radius of each image. When the view_idc[i] field is 2 or 3, the circular_image_radius[i] field may indicate, assuming that the left and right circular images have the same radius, a radius obtained after upsampling of the circular images.

According to another embodiment of the view_idc[i] field, the field view_idc[i] may have the same meaning as the region_type[i] field when the streoscopic_flag field is 1. That is, when the streoscopic_flag field is 1, the meanings of the values 0, 1, 2, and 3 of the region_type[i] field may be the same as the meanings of the values 0, 1, 2, and 3 of the view_idc[i]. In this case, the function of the view_idc[i] field may be incorporated into the region_type[i] field, and the view_idc[i] field may be omitted. The region_type [i] field will be described later.

FIG. 18 illustrates an embodiment of region_type[i] and region_info[i] fields according to the present invention.

The region_type [i] and region_info[i] fields according to the present invention may provide type information about the rectangular region and/or additional information. The fields may correspond to the region type information and additional region information described above, respectively.

The region_type[i] field may indicate the type of the rectangular region. When 360 monoscopic video data is used, this field may not have a meaning according to values. When 360 stereoscopic video data is used, this field may be used to indicate viewpoint information about the image of the corresponding rectangular region.

For example, when the value of this field is 0 or 1, it may be indicated that a single circular image is mapped to the corresponding rectangular region.

When the value of this field is 2, frame packing is applied to the rectangular region, and 360 fisheye stereoscopic video data included in the rectangular region may have the meaning of a viewing direction. This may mean that a plurality of circular images frame-packed in the rectangular region has the same viewing direction. In this case, the respective rectangular regions may be distinguished by viewing direction #1, viewing direction #2, and the like.

When the value of this field is 3, frame packing is applied to the rectangular region, and 360 fisheye stereoscopic video data included in the rectangular region may have the meaning of a viewing position. This may mean that a plurality of circular images frame-packed in the rectangular region have the same viewing position. In this case, each rectangular region may be classified as a left image, a right image, or the like.

When this field value is 2 or 3, it may be assumed that the left and right circular images have the same size and the same center. In this case, information such as a frame packing type and/or a sample position may be acquired on the reception side, using signaling information transmitted over a frame packing arrangement SEI message or the like.

In another embodiment of the fisheye video information, the region_type [i] field having a value of 0 or 1 and the region_type[i] field having the other values may not coexist in one SEI message.

In another embodiment of the fisheye video information, in the case where the region_type [i] field having a value of 0 or 1 and the region_type[i] field having the other values coexist in one SEI message, the fisheye video information may include a plurality of for-loops that separately define a rectangular region, a circle image, an angle of view, and values of yaw, pitch and roll for each region_type[i] field. In this case, the fisheye video information may have information about each view or rectangular region by dividing the view or rectangular region according to the omnidirectional_fisheye_video_id.

The region_info[i] field may provide additional information about the corresponding rectangular region according to the value of the region_type[i] field described above. The 360 video reception apparatus may use the information to recognize the attribute of the region and use the attribute in the process of projection and generation of a viewport, thereby improving processing efficiency in the process.

For example, when the value of the region_type[i] field described above is 0 or 1, a single circular image is mapped to the corresponding rectangular region, and accordingly the region_info[i] field may additionally indicate the viewing direction of the circular image.

Here, when the value of the region_type[i] field is 1 and the value of the synchronized_left_right_360camera_flag field is 0, the number of viewing directions of the right image may be different from the number of viewing directions of the left image. Therefore, the region_info[i] field may indicate the number of viewing directions of the right image according to the value of the num_viewing_directions_per_right_view_minus1 field, respectively.

When the value of the region_type[i] field described above is 2, the circular images frame-packed in the corresponding rectangular region may be grouped based on a viewing direction and mapped to the rectangular region. In this case, the region_info[i] field may indicate the viewing direction used as a reference for the rectangular region.

When the value of the region_type[i] field described above is 3, the circular images frame-packed in the rectangular region may be grouped based on a viewing position and mapped to the rectangular region. In this case, the region_info[i] field may indicate the viewing position used as a reference for the rectangular region. According to an embodiment, the region_info[i] field may have values of 0, 1, and 2, which may indicate a case where the circular images which are left images are mapped, a case where the circular images which are right images are mapped, and a case where left and right images having the same viewing direction are mapped together, respectively. According to an embodiment, when there is an odd number of viewing directions, a pair of left and right images for a single viewing direction may be mapped to one rectangular region, and the region_info[i] field may indicate a value of 2. According to an embodiment, the circular images may be defined to be fixedly arranged from left to right.

In another embodiment of the fisheye video information, when the value of the region_type[i] field described above is 3, the fisheye video information may further include viewing_direction_left_circular_image[i] and viewing_direction_right_circular_image[i] fields.

The viewing_direction_left_circular_image[i] and viewing_direction_right_circular_image[i] fields may additionally signal the viewing direction for each of the circular images within the corresponding rectangular region. As described above, when region_type[i]=3, the fisheye video information is signaled only for the viewing position of the rectangular region. Accordingly, the fields may be added to supplement this signaling. The viewing_direction_left_circular_image[i] field may indicate the viewing direction of a circular image positioned on the left side in the rectangular region, and the viewing_direction_right_circular_image[i] field may indicate the viewing direction of a circular image positioned on the right side in the rectangular region.

FIG. 19 illustrates an embodiment of a process of processing a 360 fisheye video on a reception side according to the present invention.

The process of processing a 360 fisheye video on the reception side according to the present invention may correspond to the process of extraction, projection, blending, and rendering in the above-described 360 video reception apparatus. As described above, the process of processing a 360 fisheye video on the reception side may depend on the configuration of the picture according to the view_idc[i] field, application of frame packing and the form thereof, the circular image mapping state, and the like. In this process, the above-described fisheye video information may be utilized. In the 360-degree video processing processes on the reception side described below, it is assumed that a fisheye camera having two viewing directions of front and rear is used.

In the illustrated embodiment of the 360 fisheye video processing process on the reception side, a 360 fisheye monoscopic video may be delivered through a picture, and two rectangular regions may be utilized (stereoscopic_flag=0 and num_fisheye_picture_regions_minus1=1).

Specifically, when a monoscopic camera having two fisheye lenses arranged at the front and the rear to acquire 360 video data is used, the front and rear circular images may be mapped to the picture as shown in the figure. The front circular image may be mapped to the left rectangular region of the picture, and the rear circular image may be mapped to the right rectangular region of the picture.

As described above, the rectangular regions may be specified by the upper leftmost point information, the width information, and the height information about the fisheye video information. The circular region to which the circular image is mapped may be specified by the center point index and radius information about the fisheye video information.

The 360 video reception apparatus may extract 360 fisheye video data corresponding to valid regions on the front and back sides using the fisheye video information. The 360 video reception apparatus may then perform a stitching operation (projection and blending) and render a suitable 360 monoscopic video.

FIG. 20 illustrates another embodiment of the process of processing a 360 fisheye video on the reception side according to the present invention.

In the illustrated embodiment of the 360 fisheye video processing process on the reception side, a 360 fisheye stereoscopic video may be delivered through a picture, and four rectangular regions may be utilized. The region type information may have a value of 0 or 1 (stereoscopic_flag=1, num_fisheye_picture_regions_minus1=3, and region_type=0 or 1).

Specifically, a circular image for the left image on the front side, a circular image for the right image on the front side, a circular image for the left image on the back side, and a circular image for the right image on the back side may be mapped to the picture. As shown in the figure, four rectangular regions may be defined to correspond to the circular images, respectively. In this embodiment, the 360 video transmission apparatus may map one circular image to one rectangular region.

The image arrangement according to the left and right images may be arbitrarily determined. The region type information may indicate 0 for the left image and indicate 1 for the right image. Whether a circular image is a front image or a rear image may be signaled through the above-described additional region information.

The 360 video reception apparatus may extract 360 fisheye video data corresponding to the front/rear and left/right images using the fisheye video information. The 360 video reception apparatus may then perform the stitching operation (projection and blending) for each viewing direction, thereby rendering a 360 stereoscopic video for the suitable region.

FIG. 21 illustrates another embodiment of the process of processing a 360 fisheye video on the reception side according to the present invention.

In the illustrated embodiment of the 360 fisheye video processing process on the reception side, a 360 fisheye stereoscopic video may be delivered through a picture, and two rectangular regions may be utilized. The region type information may have a value of 2 (stereoscopic_flag=1, num_fisheye_picture_regions_minus1=1, and region_type=2).

Specifically, a circular image for the left image on the front side, a circular image for the right image on the front side, a circular image for the left image on the back side, and a circular image for the right image on the back side may be mapped to the picture. In this embodiment, the 360 video transmission apparatus may map two circular images to one rectangular region by frame packing. That is, two rectangular regions may be defined, and two circular images may be mapped to one rectangular region (21010).

In this embodiment, it is assumed that synchronized_left_right_360camera_flag=1. That is, the number of viewing directions may be the same for the left image and the right image as 2 (front and back). In this embodiment, since the region_type field has a value of 2, one rectangular region may have directionality according to yaw, pitch, and roll as described above. That is, one rectangular region may indicate a viewing direction (front or back).

The illustrated rectangular region #1 (pic rgn #1) is a rectangular region indicating the viewing direction of "front", and two circular images corresponding to the front left image and the front right image are frame-packed and mapped thereto. The illustrated rectangular region #2 (pic rgn #2) is a rectangular region indicating the viewing direction of "back," and two circular images corresponding to the rear left image and the rear right image are frame-packed and mapped thereto.

That is, in this embodiment, the circular images according to each of the left and right viewing positions may be arranged in the same rectangular region. While it is illustrated in this embodiment that a side-by-side frame packing format is used, a top-and-bottom frame packing format or other frame packing formats may be used, according to embodiments.

Here, the additional region information may indicate whether the rectangular region is a rectangular region corresponding to the front side or a rectangular region corresponding to the back side.

The 360 video reception apparatus may extract each rectangular region using the fisheye video information. Thereafter, the 360 video reception apparatus may recover images corresponding to respective viewing directions (frame unpacking) using the frame packing arrangement information, and then extract circular images according to each viewing position. The 360 video reception apparatus may then perform the stitching (projection and blending) operation, thereby rendering a 360 stereoscopic video for a suitable region.

According to an embodiment, by processing only the images of a necessary portion, the stereoscopic video for the necessary portion may be generated quickly (21020). Here, the necessary portion may be a portion to be rendered according to the viewport of the current user or a portion corresponding to a region of interest (ROI) of 360 video content.

The 360 video reception apparatus may determine one or more rectangular regions having yaw, pitch, roll and/or angle of view corresponding to the viewing direction and/or viewing range corresponding to the necessary portion. The determination may be performed using the above-described fisheye video information. The 360 video reception apparatus may extract the determined (selected) rectangular region, perform frame unpacking, extract corresponding circular images, and then perform stitching, thereby quickly generating a stereoscopic video for the necessary portion.

In the illustrated embodiment 21020, an image corresponding to the front side may be an image corresponding to the necessary portion. Thus, a rectangular region corresponding to the front side may be selected, and processing on the reception side may be applied only to the selected region. Thereby, a 360 stereoscopic video for the image corresponding to the front side may be quickly provided to the user.

FIG. 22 illustrates another embodiment of the 360 fisheye video processing process on the reception side according to the present invention.

In the illustrated embodiment of the 360 fisheye video processing process on the reception side, a 360 fisheye stereoscopic video may be transmitted through a picture, and two rectangular regions may be utilized. In addition, the region type information may have a value of 3 (stereoscopic_flag=1, num_fisheye_picture_regions_minus1=1, and region_type=3).

Specifically, a circular image for the left image on the front side, a circular image for the right image on the front side, a circular image for the left image on the back side, and a circular image for the right image on the back side may be mapped to the picture. In this embodiment, the 360 video transmission apparatus may map two circular images to one rectangular region by frame packing. That is, two rectangular regions may be defined, and two circular images may be mapped to one rectangular region (22010).

In this embodiment, it is assumed that synchronized_left_right_360camera_flag=1. That is, the number of viewing directions may be the same for the left image and the right image as 2 (front and back). In this embodiment, since the region_type field has a value of 3, one rectangular region may indicate a left/right viewing position as described above. That is, one rectangular region may indicate a viewing position (left image or right image).

The illustrated rectangular region #1 (pic rgn #1) is a rectangular region indicating the viewing position of "left image," and two circular images corresponding to the front left image and the rear left image are frame-packed and mapped thereto. The illustrated rectangular region #2 (pic rgn #2) is a rectangular region indicating the viewing position of the "right image," and two circular images corresponding to the front right image and the rear right image are frame-packed and mapped thereto.

That is, in this embodiment, the circular images according to the front/back viewing directions may be arranged in the same rectangular region. While it is illustrated in this embodiment that a side-by-side frame packing format is used, a top-and-bottom frame packing format or other frame packing formats may be used, according to embodiments.

Here, as described above, the additional region information may indicate whether the rectangular region is a rectangular region corresponding to the left image or a rectangular region corresponding to the right image. In addition, as described above, the directionality of each of the circular images in one rectangular region may be indicated by viewing_direction_left[i], viewing_direction_right[i].

The 360 video reception apparatus may extract each rectangular region using the fisheye video information. Thereafter, the 360 video reception apparatus may recover images corresponding to respective viewing positions (frame unpacking) using the frame packing arrangement information, and then extract circular images according to each viewing direction. The 360 video reception apparatus may then perform the stitching operation (projection and blending), thereby rendering a 360 stereoscopic video for a suitable region.

According to the embodiment, a 360 video reception apparatus that does not support stereoscopic video may process only images corresponding to one of the viewing positions, thereby generate a monoscopic video of the corresponding 360 video more quickly (22020).

The 360 video reception apparatus may determine one of the viewing positions of the 360 fisheye video data corresponding to the left or right image. The determination may be performed using the above-described fisheye video information. For example, rectangular regions for which the above-described additional region information has a value of 0 or 2 may be selected. The 360 video reception apparatus may extract the determined (selected) rectangular region, perform frame unpacking, extract the corresponding circular images, and perform stitching, thereby quickly generating a 360 monoscopic video according to the viewing position of the left or right image.

In the illustrated embodiment 22020, a rectangular region corresponding to the left image is selected, and processing on the reception side may be applied only to the selected region. Accordingly, a 360 monoscopic video may be quickly provided to the user using only the image corresponding to the left image.

The embodiments of the 360 video processing process on the reception side according to the present invention described above may be combined with each other. In the embodiments of the 360 video reception apparatus according to the present invention, the video 360 processing process on the reception side may be the 360 fisheye video processing process on the reception side according to the above-described embodiments.

FIGS. 23 and 24 illustrate an embodiment of a circular image mapping process according to the present invention.

The circular image mapping process according to the present invention may correspond to the operation of projecting circular images onto a 3D space (a sphere or the like) and/or an ERP plane among the operations described above. In this process, corresponding operations may be performed, considering parameters which will be described later.

In the figures, the center of a circular image may be represented by (circular_image_center_x[i]*$2^{16}$, circular_image_center_x[i]*$2^{16}$). θ of the "normalized 3D fisheye lens capturing coordinate" may be expressed as αα and β, and the longitude and latitude may be expressed with θ. In addition, the process of presenting the circular images in the 3D spherical coordinate system may be represented using the parameters transmitted in the present invention.

That is, as shown in the figures, the equations for respective cases may be described. The respective cases may be fisheye coordinate to 3D fisheye lens capturing coordinate conversion, 3D fisheye lens capturing coordinate to XYZ coordinate conversion, XYZ coordinate to spherical coordinate conversion and/or spherical coordinate to ERP coordinate conversion.

Here, circular_image_center_x[i], circular_image_center_y [i], circular_image_radius[i], and field_of_view[i] may be in 16 bits and assumed to present integers and decimal portions in 16 bits.

The embodiments of the circular image mapping process according to the present invention described above may be combined with each other. In the embodiments of the 360 video reception apparatus according to the present invention, the process of mapping a circular image is similar to the circular image processing process according to the above-described embodiments.

FIG. 25 illustrates another embodiment of the fisheye video information according to the present invention.

In the illustrated embodiment of the fisheye video information, the fisheye video information may be delivered in the form of a box in an ISOBMFF file as described above. Here, the fisheye video information may be defined as OmnidirectionalFisheyeVideoInformationStruct.

OmnidirectionalFisheyeVideoInformationStruct may be defined as a box, which may be included in the ISOBMFF file. That is, the 360 fisheye video data may be stored and transmitted based on the ISOBMFF file, and OmnidirectionalFisheyeVideoInformationStruct may be delivered in a box form in the ISOBMFF file.

According to an embodiment, this box may be signaled for the 360 fisheye video data stored/delivered through the corresponding video track (stream), sample, sample group, or the like. According to an embodiment, the box may be present under a visual sample entry of a track through which the 360 fisheye video data is stored/transmitted. According to an embodiment, the fisheye video information may be delivered in a format such as CFF.

In the fisheye video information according to the illustrated embodiment, the respective fields may have the same meaning as the fields of the fisheye video information transmitted over the SEI message described above.

FIG. 26 illustrates another embodiment of a fisheye video delivery method according to the present invention.

In the illustrated embodiment 26010, an OmnidirectionalFisheyeVideoInformationSEI box (ofvb) may be defined. The ofvb box may include an SEI NAL unit, which may include an SEI message containing fisheye video information.

The ofvb box may be included in VisualSampleEntry 26020, AVCSampleEntry, MVCSampleEntry, SVCSampleEntry, and HEVCSampleEntry 26030 and 26040, which are associated with the corresponding fisheye video information. When the box included in HEVCSampleEntry, it may be included in HEVCConfigurationBox 26030, or may be directly included in HEVCSampleEntry 26040.

According to an embodiment, the ofvb box may be included in the SEI or Video Usability Information (VUI) that provides related information according to the region. Thereby, different signaling information may be provided for each region for a video frame included in the file format.

According to an embodiment, the fisheye video information may be defined as OmnidirectionalFisheyeVideoInformationStruct ('ofvi') and delivered in timed metadata (26050, 26060). Here, the meaning of each field in ofvi may be the same as that defined in the SEI message.

In this case, when the content of the fisheye video information delivered in the timed metadata is identically applied to all video samples, ofvi may be included in the sample entry in the header (moov or moof box) of the timed metadata track (26050). In this case, the content of ofvi may be applied to all metadata samples in mdat.

Alternatively, when the content of the fisheye video information delivered in the timed metadata is to be applied differently according to the video samples, ofvi may be included in the timed metadata sample (26060). In this case, the content of ofvi may be applied to the corresponding video sample.

When the content of the fisheye video information transmitted in the time metadata is to be applied to the entire video sequence, ofvi may be included in the sample entry of the timed metadata track as described above, and the meaning thereof may be extend such that information in ofvi can be applied to the entire video sequence.

For example, assuming that the 360 fisheye camera that has captured a video sequence is not changed, the content of the disparity, field_of_view, num_viewing_directions_minus1, center_yaw, center_pitch, center_roll and synchronized_left_right_360camera_flag, num_viewing_directions_per_right_view_minus1, center_yaw_per_right_view, center_pitch_per_right_view, center_roll_per_right_view fields may be applied to the entire video sequence.

In addition, when the image packing format is the same, the content of rect_region_top, rect_region_left, rect_region_width, rect_region_height, circular_image_center_x, circular_image_center_y, and circular_image_radius as well as num_picture_regions_minus1, region_type, region_info, viewing_direction_left_circular_image, and viewing_direction_right_circular_image may be defined to be applied to the entire video sequence and be referenced.

FIG. 27 illustrates another embodiment of the fisheye video information according to the present invention.

In the illustrated embodiment of the fisheye video information, the fisheye video information may be described in the form of a DASH-based descriptor.

The DASH-based descriptor may include an @schemeIdUri field, an @value field, and/or an @id field. The @schemeIdUri field may provide a URI for identifying the scheme of the descriptor. The @value field may have values whose meaning is defined by the scheme indicated by the @schemeIdUri field. That is, the @value field may have values of descriptor elements, which may be called parameters, according to the scheme. The parameters may be separated by ",". The @id field may represent the identifier of the descriptor. When the same identifier is given, the field may include the same scheme ID, value, and parameter.

When the fisheye video information is delivered according to the DASH, the fisheye video information may be described in the form of a DASH descriptor and included in the MPD so as to be transmitted to the reception side. The descriptors may be delivered in the form of the Essential- Property descriptor and/or the SupplementalProperty descriptor described above. The descriptors may be delivered in the adaptation set, representation, subrepresentation, and the like of the MPD.

In the case of the illustrated descriptor for delivering the fisheye video information, the @schemeIdURI field may have a value of urn:mpeg:dash:vr:201x. This value may be a value that identifies that the descriptor is a descriptor for delivering the fisheye video information.

The @value field of this descriptor may have a value as in the illustrated embodiment. That is, the respective parameters separated by "," of @value may correspond to the respective fields of the above-described fisheye video information. The meaning of the respective parameters may be the same as that of the fields of the above-described fisheye video information. In the illustrated embodiment, each parameter may have the same meaning as the above-described signaling field having the same name.

The fisheye video information according to all the above-described embodiments may also be described in the form of a DASH-based descriptor. That is, in the illustrated embodiment, one of the various embodiments of the above-described fisheye video information is described with a parameter of @value. However, for all the above-described embodiments of the fisheye video information, respective signaling fields may be replaced by and described with a parameter of @value.

Here, M may mean that the parameter is mandatory, O may mean that the parameter is optional, and OD may mean that the parameter is optional with default. When a parameter value of OD is not given, a predefined default value may be used as the parameter value. In the illustrated embodiment, the default values of the respective OD parameters are given in parentheses.

The above-described embodiments of the fisheye video information may be combined with each other. In the embodiments of the 360 video transmission apparatus and/or the 360 video reception apparatus according to the present invention, the fisheye video information may be the fisheye video information according to the above-described embodiments.

Figure 28:
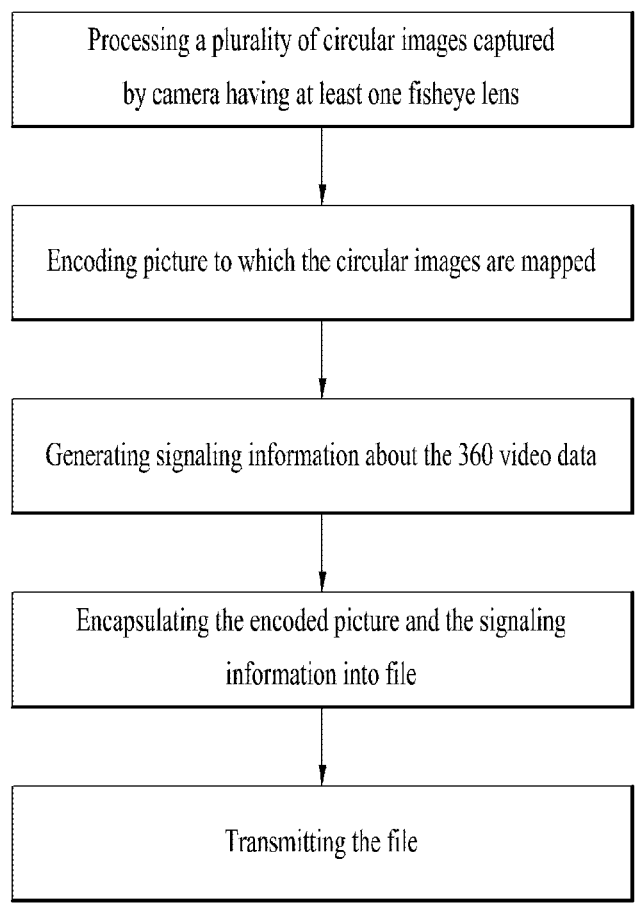
FIG. 28 illustrates an embodiment of a method for transmitting 360 video, which may be performed by the 360 video transmission apparatus according to the present invention.

FIG. 28 illustrates an embodiment of a method for transmitting 360 video, which may be performed by the 360 video transmission apparatus according to the present invention.

One embodiment of a method for transmitting 360 video may include processing a plurality of circular images captured by a camera having at least one fisheye lens, encoding a pictures to which the circular images are mapped, generating signaling information about the 360 vide data, encapsulating the encoded picture and the signaling information into a file, and/or transmitting the file.

The video processor of the 360 video transmission apparatus may process one or more circular images captured by the camera having at least one fisheye lens. Here, the circular images may include 360 video data. In this processing operation, the video processor may map the circular images to the rectangular regions of a picture having a fisheye video format.

The data encoder of the 360 video transmission apparatus may encode the picture to which the circular images are mapped. The metadata processor of the 360 video transmission apparatus may generate signaling information about the 360 video data. Here, the signaling information may include fisheye video information for processing the circular images at the receiver. The encapsulation processor of 360 video transmission apparatus may encapsulate the encoded picture and the signaling information into a file. The transmission unit of the 360 video transmission apparatus may transmit the file.

In another embodiment of the method for transmitting a 360 video, the fisheye video information may include information for describing each of the circular images and information for describing each of the rectangular regions to which the circular images are mapped. The information for describing the circular images and the information for describing the rectangular regions may be used for the receiver to extract 360 video data corresponding to the intersection of the circular images and the rectangular regions.

In another embodiment of the method for transmitting a 360 video, the information for describing the circular image may include information indicating the angle of view of the fisheye lens having captured the circular image and information indicating the coordinates of a center point of a region occupied by the circular image in a 3D space. The information for describing the rectangular region may include information indicating the position of the upper leftmost point, width, and height of the rectangular region to specify the rectangular region and information indicating the coordinates of the center point and a radius of the circular image mapped to the rectangular region to specify the circular image.

In another embodiment of the method for transmitting a 360 video, the information for describing the rectangular region may include region type information and/or additional region information having a different meaning according to the region type information. The circular images mapped to the picture may include may include 360 stereoscopic video data. The region type information may indicate a viewing position of a single circular image mapped to the rectangular region, and the additional region information may indicate a viewing direction of the single circular image mapped to the rectangular region.

In another embodiment of the method for transmitting a 360 video, the region type information may further indicate whether a plurality of circular images having the same viewing direction is mapped to the rectangular region, and the additional region information may indicate the same viewing direction of the plurality of circular images mapped to the rectangular region.

In another embodiment of the method for transmitting a 360 video, the region type information may further indicate whether a plurality of circular images having the same viewing position is mapped to the rectangular region, and the additional region information may indicate the same viewing position of the plurality of circular images mapped to the rectangular region.

In another embodiment of the method for transmitting a 360 video, in the operation of processing the circular images, the circular images may not be subjected to stitching or region-wise packing.

In another embodiment of the method for transmitting a 360 video, the fisheye video information may be generated in the form of a DASH descriptor, included in the MPD and transmitted through a separate path different from that of the file.

The 360 video reception apparatus according to the present invention described above may implement a method for receiving a 360 video. The method for receiving a 360 video may have embodiments corresponding to the method for transmitting a 360 video according to the present invention described above. The method for receiving a 360 video and the embodiments thereof may be implemented by the 360 video reception apparatus and the internal/external components thereof according to the present invention described above.

Here, the region (having a meaning in region-wise packing) may refer to a region in which a 360 video data projected onto a 2D image is positioned within a packed frame through region-wise packing. Here, the region may refer to a region used in the region-wise packing depending on the context. As described above, the regions may be distinguished by dividing the 2D image equally or arbitrarily according to the projection scheme or the like.

Here, the region (having a general meaning) may be used according to the dictionary definition thereof, unlike the region used in the above-described region-specific packing. In this case, the region may have the meaning of "area," "section," "part," or the like as defined in the dictionary. For example, in referring to one area of a face which will be described later, an expression such as "one region of the face" may be used. In this case, the region is distinguished from the region in the above-described region-specific packing, and both regions may indicate different regions irrelevant to each other.

Here, the picture may refer to the entire 2D image onto which the 360 video data is projected. According to an embodiment, a projected frame or a packed frame may be a picture.

Here, a subpicture may refer to a part of the above-mentioned picture. For example, a picture may be divided into several subpictures to perform tiling or the like. In this case, each subpicture may be a tile.

Here, a tile is a sub-concept of a subpicture, and a subpicture may be used as a tile for tiling. That is, in tiling, the subpicture may be conceptually the same as the tile.

A spherical region or sphere region may refer to one region in a spherical surface when 360 video data is rendered on a 3D space (e.g., a sphere) on the reception side. Here, the spherical region is irrelevant to the region in the region-wise packing. In other words, the spherical region does not need to mean the same region as the region defined in the region-wise packing. The spherical region is a term used to refer to a part of a spherical surface to which rendering is performed, where "region" may refer to the "region" as defined in the dictionary. Depending on the context, the spherical region may simply be called a region.

Here, the face may be a term that refers to each face according to a projection scheme. For example, when cubemap projection is used, the front, back, both sides, top, and bottom may be referred to as faces.

Each of the aforementioned parts, modules or units may be a processor or a hardware part designed to execute a series of execution steps stored in a memory (or a storage unit). Each step described in the above-mentioned embodiments may be implemented by processors or hardware parts. Each module, each block, and/or each unit described in the above-mentioned embodiments may be realized by a processor/hardware. In addition, the above-mentioned methods of the present invention may be realized by code written in recoding media configured to be read by a processor so that the code may be read by the processor provided by the apparatus.

Although the description of the present invention is explained with reference to each of the accompanying drawings for clarity, it is possible to design new embodiments by merging the embodiments shown in the accompanying drawings with each other. If a recording medium readable by a computer, in which programs for executing the embodiments mentioned in the foregoing description are recorded, is designed by those skilled in the art, it may fall within the scope of the appended claims and their equivalents.

The devices and methods according to the present invention may be non-limited by the configurations and methods of the embodiments mentioned in the foregoing description. The embodiments mentioned in the foregoing description may be configured in a manner of being selectively combined with one another entirely or in part to enable various modifications.

In addition, a method according to the present invention may be implemented with processor-readable code in a processor-readable recording medium provided to a network device. The processor-readable medium may include all kinds of recording devices capable of storing data readable by a processor. The processor-readable medium may include one of ROM, RAM, CD-ROM, magnetic tapes, floppy disks, optical data storage devices, and the like and also include carrier-wave type implementation such as a transmission via Internet. Furthermore, as the processor-readable recording medium is distributed to a computer system connected via a network, processor-readable code may be saved and executed in a distributed manner.

Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

It will be appreciated by those skilled in the art that various modifications and variations may be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both the apparatus and method inventions may be complementarily applicable to each other.

MODE FOR INVENTION

Various embodiments have been described in the best mode for carrying out the invention.

INDUSTRIAL APPLICABILITY

The present invention is used in a series of VR related fields.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

What is claimed is:

1. A method for transmitting omnidirectional media content in a digital transmitter, the method comprising:
mapping at least one circular image onto a picture in a video format;
encoding the picture as a coded video bitstream;
generating metadata which assists in rendering the picture,
wherein the metadata includes rectangular region top/left information, rectangular region width information, rectangular region height information, circular image centre information and circular image radius information,
wherein the rectangular region top/left information is used to represent a coordinate of a top-left corner of a rectangular region that contains the at least one circular image,
wherein the rectangular region width information is used to represent a coordinate of an width of the rectangular region that contains the at least one circular image,
wherein the rectangular region height information is used to represent a coordinate of a height of the rectangular region that contains the at least one circular image,
wherein the circular image radius information is used to represent a radius of the at least one circular image that is defined as a length from the centre of the at least one circular image specified by the circular image centre information to the outermost boundary of the at least one circular image; and
transmitting a signal including a coded audio stream, the coded video bitstream and the generated metadata.

2. The method of claim 1, wherein the at least one circular image is captured by at least one fisheye lens.

3. The method of claim 1, wherein the picture includes non-stitched circular images.

4. The method of claim 1, wherein the step of transmitting further comprises:
composing the coded audio bitstream, the coded video bitstream and the metadata into a media file for file playback.

5. The method of claim 1, wherein the step of transmitting further comprises:
composing the coded audio bitstream, the coded video bitstream and the metadata into a sequence of an initialization segment and media segments for streaming.

6. The method of claim 1, wherein the circular image centre information is used to represent position information of a centre of the at least one circular image.

7. The method of claim 6, wherein the position information includes a horizontal coordinate value and a vertical coordinate value of the centre of the at least one circular image.

8. A method for receiving omnidirectional media content in a digital receiver, the method comprising:
receiving a signal including a coded audio bitstream, a coded video bitstream and metadata from a digital transmitter;
wherein the metadata includes rectangular region top/left information, rectangular region width information, rectangular region height information, circular image centre information and circular image radius information,
wherein the rectangular region top/left information is used to represent a coordinate of a top-left corner of a rectangular region that contains at least one circular image,
wherein the rectangular region width information is used to represent a coordinate of an width of the rectangular region that contains the at least one circular image,
wherein the rectangular region height information is used to represent a coordinate of a height of the rectangular region that contains the at least one circular image,
wherein the circular image radius information is used to represent a radius of the at least one circular image that is defined as a length from the centre of the at least one circular image specified by the circular image centre information to the outermost boundary of the at least one circular image;
decoding the coded video bitstream;
decoding the coded audio bitstream;
rendering the decoded video bitstream; and
rendering the decoded audio bitstream.

9. The method of claim 8, wherein the at least one circular image is captured by at least one fisheye lens.

10. The method of claim 8, wherein the user's viewport is determined based on a result of a head or eye tracking.

11. The method of claim 8, wherein the coded audio bitstream, the coded video bitstream and the metadata is received as a media file for file playback.

12. The method of claim 8, wherein the coded audio bitstream, the coded video bitstream and the metadata is received as a sequence of an initialization segment and media segments for streaming.

13. The method of claim 8, wherein the circular image centre information is used to represent position information of a centre of the at least one circular image.

14. The method of claim 13, wherein the position information includes a horizontal coordinate value and a vertical coordinate value of the centre of the at least one circular image.

15. A digital receiver for receiving omnidirectional media content, the digital receiver comprising:
a receiving module configured to receive a signal including a coded video bitstream, a coded audio bitstream and metadata from a digital transmitter;
wherein the metadata includes rectangular region top/left information, rectangular region width information, rectangular region height information, circular image centre information and circular image radius information,
wherein the rectangular region top/left information is used to represent a coordinate of a top-left corner of a rectangular region that contains at least one circular image,
wherein the rectangular region width information is used to represent a coordinate of an width of the rectangular region that contains the at least one circular image,
wherein the rectangular region height information is used to represent a coordinate of a height of the rectangular region that contains the at least one circular image,
wherein the circular image radius information is used to represent a radius of the at least one circular image that is defined as a length from the centre of the at least one circular image specified by the circular image centre information to the outermost boundary of the at least one circular image;
a video decoder configured to decode the coded video bitstream;
an audio decoder configured to decode the coded audio bitstream;
a video renderer configured to render the decoded video bitstream; and an audio renderer configured to render the decoded audio bitstream.

16. The digital receiver of claim 15, wherein the at least one circular image is captured by at least one fisheye lens.

17. The digital receiver of claim 15, wherein the user's viewport is determined based on a result of a head or eye tracking.

18. The digital receiver of claim 15, wherein the coded audio bitstream, the coded video bitstream and the metadata is received as a media file for file playback.

19. The digital receiver of claim 15, wherein the coded audio bitstream, the coded video bitstream and the metadata is received as a sequence of an initialization segment and media segments for streaming.

20. The digital receiver of claim 15,
  wherein the circular image centre information is used to represent position information of a centre of the at least one circular image,
  wherein the position information includes a horizontal coordinate value and a vertical coordinate value of the centre of the at least one circular image.

\* \* \* \* \*